US009656793B2

United States Patent
Leser et al.

(10) Patent No.: US 9,656,793 B2
(45) Date of Patent: *May 23, 2017

(54) PROCESS FOR FORMING AN INSULATED CONTAINER HAVING ARTWORK

(71) Applicant: Berry Plastics Corporation, Evansville, IN (US)

(72) Inventors: Chris K Leser, Evansville, IN (US); Charles T Wallace, Evansville, IN (US); Philip A Driskill, Newburgh, IN (US); John B Euler, Evansville, IN (US); Jason J Paladino, Newburgh, IN (US); Milan C Maravich, Newburgh, IN (US); Daniel O Davis, Cynthiana, IN (US); Jeffrey A Mann, Evansville, IN (US); Randy A Bowlds, Evansville, IN (US); Svetlana I Contrada, Manalapan, NJ (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,319

(22) Filed: May 29, 2015

(65) Prior Publication Data

US 2015/0258771 A1 Sep. 17, 2015

Related U.S. Application Data

(63) Continuation of application No. 14/718,836, filed on May 21, 2015, which is a continuation of application
(Continued)

(51) Int. Cl.
*B29C 65/02* (2006.01)
*B32B 37/06* (2006.01)
(Continued)

(52) U.S. Cl.
CPC ..... *B65D 81/3874* (2013.01); *A47G 19/2288* (2013.01); *A47J 41/00* (2013.01);
(Continued)

(58) Field of Classification Search
USPC .......... 156/277, 304, 1, 304.3, 304.6, 307.1, 156/307.3, 307.5, 308.2, 308.4; 428/35.7
See application file for complete search history.

(56) References Cited

U.S. PATENT DOCUMENTS 1,396,282 A 11/1921 Penn
1,435,120 A 11/1922 Holman
(Continued)

FOREIGN PATENT DOCUMENTS

CN 1495100 5/2004
CN 1942370 4/2007
(Continued)

OTHER PUBLICATIONS

International Search Report and Written Opinion dated Oct. 18, 2013, relating to International Application No. PCT/US2013/053935.
(Continued)

*Primary Examiner* — Sing P Chan
(74) *Attorney, Agent, or Firm* — Barnes & Thornburg LLP

(57) ABSTRACT

A container is formed to include and interior region and a mouth opening into the interior region. The container includes a floor, a side wall coupled to the floor to define the interior region between the floor and the side wall, and artwork on the side wall.

18 Claims, 14 Drawing Sheets

Related U.S. Application Data

No. 13/526,454, filed on Jun. 18, 2012, now Pat. No. 9,067,705, which is a continuation-in-part of application No. 13/491,007, filed on Jun. 7, 2012, and a continuation-in-part of application No. 13/491,327, filed on Jun. 7, 2012, now Pat. No. 8,883,280.

(60) Provisional application No. 61/498,415, filed on Jun. 17, 2011, provisional application No. 61/618,637, filed on Mar. 30, 2012, provisional application No. 61/498,435, filed on Jun. 17, 2011, provisional application No. 61/618,632, filed on Mar. 30, 2012, provisional application No. 61/498,455, filed on Jun. 17, 2011, provisional application No. 61/600,388, filed on Feb. 17, 2012, provisional application No. 61/618,614, filed on Mar. 30, 2012, provisional application No. 61/618,620, filed on Mar. 30, 2012, provisional application No. 61/529,632, filed on Aug. 31, 2011, provisional application No. 61/618,604, filed on Mar. 30, 2012, provisional application No. 61/618,587, filed on Mar. 30, 2012.

(51) Int. Cl.

| | |
|---|---|
| *B32B 37/18* | (2006.01) |
| *B32B 38/14* | (2006.01) |
| *B32B 43/00* | (2006.01) |
| *C08J 5/12* | (2006.01) |
| *B65D 81/38* | (2006.01) |
| *A47J 41/00* | (2006.01) |
| *A47G 19/22* | (2006.01) |
| *B32B 38/00* | (2006.01) |
| *B29C 47/00* | (2006.01) |
| *B29C 47/06* | (2006.01) |
| *B29C 47/36* | (2006.01) |
| *B29C 44/04* | (2006.01) |
| *B29C 44/56* | (2006.01) |
| *B29C 51/08* | (2006.01) |
| *B31B 1/26* | (2006.01) |
| *B65D 5/40* | (2006.01) |
| *B29C 47/50* | (2006.01) |
| *B41F 3/00* | (2006.01) |
| *B31B 1/00* | (2006.01) |
| *B32B 37/10* | (2006.01) |
| *B32B 37/14* | (2006.01) |
| *B29L 31/00* | (2006.01) |
| *B32B 37/12* | (2006.01) |
| *B32B 37/15* | (2006.01) |
| *B29C 53/36* | (2006.01) |

(52) U.S. Cl.
CPC ........ *B29C 44/0446* (2013.01); *B29C 44/569* (2013.01); *B29C 47/004* (2013.01); *B29C 47/0021* (2013.01); *B29C 47/065* (2013.01); *B29C 47/366* (2013.01); *B29C 47/50* (2013.01); *B29C 51/08* (2013.01); *B31B 1/00* (2013.01); *B31B 1/26* (2013.01); *B32B 37/10* (2013.01); *B32B 37/14* (2013.01); *B32B 38/0004* (2013.01); *B32B 38/145* (2013.01); *B41F 3/00* (2013.01); *B65D 5/40* (2013.01); *B65D 81/3865* (2013.01); *B29C 47/0042* (2013.01); *B29C 47/0064* (2013.01); *B29C 47/0066* (2013.01); *B29C 47/0069* (2013.01); *B29C 53/36* (2013.01); *B29L 2031/7132* (2013.01); *B31B 2201/88* (2013.01); *B31B 2217/0084* (2013.01); *B31B 2217/062* (2013.01); *B31B 2217/064* (2013.01); *B32B 37/12* (2013.01); *B32B 37/153* (2013.01); *B32B 2307/102* (2013.01); *B32B 2323/10* (2013.01); *B32B 2439/00* (2013.01); *B32B 2439/02* (2013.01); *B65D 2203/00* (2013.01)

(56) References Cited

U.S. PATENT DOCUMENTS

| | | |
|---|---|---|
| 1,920,529 A | 8/1933 | Sidebotham |
| 1,969,030 A | 8/1934 | Page |
| 2,097,899 A | 12/1935 | Smith |
| 2,809,776 A | 3/1956 | Barrington |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Gilbert |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,733,381 A | 5/1973 | Willette |
| 3,793,283 A | 2/1974 | Frailey |
| 3,846,349 A | 11/1974 | Harada |
| 3,907,193 A | 9/1975 | Heller |
| 3,919,368 A | 11/1975 | Seto |
| RE28,658 E | 12/1975 | Macdaniel |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,240,568 A | 12/1980 | Pool |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,490,130 A | 12/1984 | Konzal |
| 4,550,046 A | 10/1985 | Miller |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,878,970 A | 11/1989 | Schubert |
| 4,918,112 A | 4/1990 | Roox |
| 4,940,736 A | 7/1990 | Alteepping |
| 5,078,817 A | 1/1992 | Takagaki |
| 5,116,881 A | 5/1992 | Park |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |

(56) References Cited

U.S. PATENT DOCUMENTS

| | | |
|---|---|---|
| 5,308,568 A | 5/1994 | Lipp |
| 5,348,795 A | 9/1994 | Park |
| 5,366,791 A | 11/1994 | Carr |
| 5,385,260 A | 1/1995 | Gatcomb |
| 5,443,769 A | 8/1995 | Karabedian |
| 5,445,315 A | 8/1995 | Shelby |
| 5,490,631 A | 2/1996 | Iioka |
| 5,507,640 A | 4/1996 | Gilmer |
| 5,547,124 A | 8/1996 | Mueller |
| 5,549,864 A | 8/1996 | Greene |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,866,053 A | 2/1999 | Park |
| 5,868,309 A | 2/1999 | Sandstrom |
| 5,895,614 A | 4/1999 | Rivera |
| 5,925,450 A | 7/1999 | Karabedian |
| 5,928,741 A | 7/1999 | Andersen |
| 5,944,225 A | 8/1999 | Kawolics |
| 5,948,839 A | 9/1999 | Chatterjee |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,071,580 A | 6/2000 | Bland |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,231,942 B1 | 5/2001 | Blizard |
| 6,235,380 B1 | 5/2001 | Tupil |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,328,916 B1 | 12/2001 | Nishikawa |
| 6,376,059 B1 | 4/2002 | Anderson |
| 6,378,733 B1 | 4/2002 | Boonzaier |
| 6,379,802 B2 | 4/2002 | Ito |
| 6,383,425 B1 | 5/2002 | Wu |
| 6,420,024 B1 | 7/2002 | Perez |
| 6,444,073 B1 | 9/2002 | Reeves |
| 6,455,150 B1 | 9/2002 | Sheppard |
| 6,468,451 B1 | 10/2002 | Perez |
| 6,472,473 B1 | 10/2002 | Ansems |
| RE37,932 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |
| 6,811,843 B2 | 11/2004 | DeBraal |
| 6,814,253 B2 | 11/2004 | Wong |
| 6,875,826 B1 | 4/2005 | Huovinen |
| 6,883,677 B2 | 4/2005 | Goeking |
| 6,884,377 B1 | 4/2005 | Burnham |
| 6,884,851 B2 | 4/2005 | Gauthy |
| 6,908,651 B2 | 6/2005 | Watanabe |
| 6,926,507 B2 | 8/2005 | Cardona |
| 6,926,512 B2 | 8/2005 | Wu |
| 6,982,107 B1 | 1/2006 | Hennen |
| 7,056,563 B2 | 6/2006 | Halabisky |
| 7,070,852 B1 | 7/2006 | Reiners |
| 7,074,466 B2 | 7/2006 | DeBraal |
| 7,094,463 B2 | 8/2006 | Haas |
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Ho |
| 7,281,650 B1 | 10/2007 | Milan |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,404 B2 | 7/2010 | Burgun |
| 7,786,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,928,162 B2 | 4/2011 | Kiss |
| 7,935,740 B2 | 5/2011 | Dang |

(56) References Cited

U.S. PATENT DOCUMENTS

| | | |
|---|---|---|
| 7,947,367 B2 | 5/2011 | Poon |
| 7,951,882 B2 | 5/2011 | Arriola |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,234 B2 | 2/2012 | Weaver |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,404,780 B2 | 3/2013 | Weaver |
| 8,435,615 B2 | 5/2013 | Tsuchida |
| 8,679,620 B2 | 3/2014 | Matsushita |
| 8,715,449 B2* | 5/2014 | Leser .................. B31B 1/00 156/277 |
| 8,721,823 B2 | 5/2014 | Vaideeswaran |
| 8,883,280 B2 | 11/2014 | Leser |
| 9,067,705 B2* | 6/2015 | Leser .................. B31B 1/00 |
| 9,180,995 B2 | 11/2015 | Iyori |
| 9,358,772 B2* | 6/2016 | Leser .................. B31B 1/00 |
| 2001/0010848 A1 | 8/2001 | Usui |
| 2001/0010849 A1 | 8/2001 | Blizard |
| 2001/0038893 A1 | 11/2001 | Mohan |
| 2001/0041236 A1 | 11/2001 | Usui |
| 2002/0030296 A1 | 3/2002 | Geddes |
| 2002/0041046 A1 | 4/2002 | Hartjes |
| 2002/0058126 A1 | 5/2002 | Kannankeril |
| 2002/0135088 A1 | 9/2002 | Harfmann |
| 2002/0137851 A1 | 9/2002 | Kim |
| 2002/0144769 A1 | 10/2002 | Debraal |
| 2002/0172818 A1 | 11/2002 | DeBraal |
| 2003/0003251 A1 | 1/2003 | DeBraal |
| 2003/0017284 A1 | 1/2003 | Watanabe |
| 2003/0021921 A1 | 1/2003 | Debraal |
| 2003/0029876 A1 | 2/2003 | Giraud |
| 2003/0108695 A1 | 6/2003 | Freek |
| 2003/0138515 A1 | 7/2003 | Harfmann |
| 2003/0211310 A1 | 11/2003 | Haas |
| 2003/0228336 A1 | 12/2003 | Gervasio |
| 2003/0232210 A1 | 12/2003 | Haas |
| 2004/0013830 A1 | 1/2004 | Nonomura |
| 2004/0031714 A1 | 2/2004 | Hanson |
| 2004/0038018 A1 | 2/2004 | Anderson |
| 2004/0062885 A1 | 4/2004 | Imanari |
| 2004/0115418 A1 | 6/2004 | Anderson |
| 2004/0170814 A1 | 9/2004 | VanHandel |
| 2005/0003122 A1 | 1/2005 | Debraal |
| 2005/0006449 A1 | 1/2005 | DAmato |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0094577 A1 | 5/2006 | Mannlein |
| 2006/0095151 A1 | 5/2006 | Mannlein |
| 2006/0108409 A1 | 5/2006 | Pyper |
| 2006/0135699 A1 | 6/2006 | Li |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |
| 2008/0020162 A1 | 1/2008 | Fackler |
| 2008/0045638 A1 | 2/2008 | Chapman |
| 2008/0118738 A1 | 5/2008 | Boyer |
| 2008/0138593 A1 | 6/2008 | Martinez |
| 2009/0110855 A1 | 4/2009 | McCarthy |
| 2009/0263645 A1 | 10/2009 | Barger |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0116422 A1 | 5/2010 | Vaideeswaran |
| 2010/0137118 A1 | 6/2010 | Chang |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0240818 A1 | 9/2010 | Walton |
| 2010/0279571 A1 | 11/2010 | Poon |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |

(56) References Cited

U.S. PATENT DOCUMENTS

| | | |
|---|---|---|
| 2011/0318560 A1 | 12/2011 | Yun |
| 2012/0004087 A1 | 1/2012 | Tharayil |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0032963 A1 | 2/2013 | Tokiwa |
| 2013/0052385 A1 | 2/2013 | Leser |
| 2013/0140320 A1 | 6/2013 | Nadella |
| 2013/0216744 A1 | 8/2013 | Liao |
| 2013/0280517 A1 | 10/2013 | Buehring |
| 2013/0303645 A1 | 11/2013 | Dix |
| 2014/0131430 A1 | 5/2014 | Leser |
| 2014/0263367 A1 | 9/2014 | Robertson |
| 2015/0250342 A1 | 9/2015 | Euler |
| 2015/0258771 A1 | 9/2015 | Leser |

FOREIGN PATENT DOCUMENTS

| | | |
|---|---|---|
| CN | 101370873 | 2/2009 |
| CN | 101531260 | 9/2009 |
| CN | 101538387 | 9/2009 |
| CN | 102115561 | 7/2011 |
| CN | 102245368 | 11/2011 |
| CN | 102391570 | 3/2012 |
| CN | 102762350 | 10/2012 |
| EP | 0001791 | 5/1979 |
| EP | 0086869 | 8/1983 |
| EP | 0520028 | 12/1992 |
| EP | 0588321 | 3/1994 |
| EP | 0879844 | 11/1998 |
| EP | 0972727 | 1/2000 |
| EP | 1323779 | 7/2003 |
| EP | 2720954 | 4/2014 |
| GB | 2485077 | 5/2012 |
| JP | S5641146 A | 4/1981 |
| JP | H02129040 U | 5/1990 |
| JP | 0615751 | 1/1994 |
| JP | 06192460 | 7/1994 |
| JP | 2006142008 A | 6/2006 |
| JP | 2007154172 | 6/2007 |
| JP | 2008162700 | 7/2008 |
| JP | 2009126922 | 6/2009 |
| JP | 2009138029 | 6/2009 |
| WO | 9113933 | 9/1991 |
| WO | 9413460 | 6/1994 |
| WO | 9729150 | 8/1997 |
| WO | 0002800 | 1/2000 |
| WO | 0234824 | 5/2002 |
| WO | 2007003523 | 1/2007 |
| WO | 2007090845 A2 | 8/2007 |
| WO | 2008145267 | 12/2008 |
| WO | 2011036272 | 3/2011 |
| WO | 2012173873 | 12/2012 |
| WO | 2012174422 | 12/2012 |
| WO | 2012174567 | 12/2012 |
| WO | 2012174568 | 12/2012 |
| WO | 2013101301 | 7/2013 |

OTHER PUBLICATIONS

International Preliminary Report on Patentability dated Feb. 16, 2016, relating to International Application No. PCT/US2014/051508.

English Summary of Chinese Office Action for Application Serial No. 201380041896.1, dated Mar. 21, 7 pages.

Extended European Search Report for European Application No. 13827981.5-1708 / 2888092 PCT/US2013/053935, dated Feb. 19, 2016.

Australian First Patent Examination Report for Application No. 2012271047, dated Feb. 29, 2016.

N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).

Nigel Mills, Polymer Foams Handbook, Fig. 2.2, 1st ed. 2007 (2 pages).

University of Massachusetts, Advanced Plastics Processing Lecture, Lecture 11: Foam Processes, Slide 4 (Nov. 11, 2012) (2 pages).

Australian Second Patent Examination Report for Application No. 2012302251, dated Feb. 26, 2016.

English summary of Chinese Office Action for Chinese Application Serial No. 201380065781.6, Apr. 19, 2016, 14 pages.

Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daployhmspp-extruded-foam/).

Reichelt et al., "PP-Blends with Tailored Foamability and Mechanical Properties", Cellular Polymers, vol. 22, No. 5, 2003, 14 pages.

Ratzsch et al., "Radical reactions on polypropylene in the solid state", Prog. Polym. Sci. 27 (2002) 1195-1282, 88 pages.

Excerpts from Encyclopedia of Polymer Science and Technology: Plastics, Resins, Rubbers, and Fibers, "Blowing Agents", vol. 2, John Wiley & Sons, Inc. (1965), 37 pages.

Excerpts from Polymer Foams: Science and Technology, Lee et al., "Introduction to Polymeric Foams", CRC Press (2007) 51 pages.

"Daploy(TM) HMS Polypropylene for Foam Extrusion", obtained from Borealis webpage obtained from the Internet Archive\s "Wayback Machine" as of Nov. 16, 2008 https://web.archive.org/web/20081116085125/http://www.borealisgroup.com/pdf/literature/borealisborouge/brochure/K_IN0020_GB_FF_2007_10_BB.pdf).

Excerpts from Gibson and Ashby, Cellular solids: Structure and properties—Second edition, Cambridge University Press, 1997, 66 pages.

Excerpts from Maier and Calafut, Polypropylene: the Definitive User's Guild and Databook, Plastics Design Library, William Andrew Inc. (1998), 35 pages.

ASTM D3763-86, an American Society for Testing of Materials (ASTM), "Standard Method for High-Speed Puncture Properties of Plastics Using Load and Displacement Sensors" (1986 Edition), 5 pages.

ASTM D1922-93, an American Society for Testing of Materials (ASTM), "Standard Method for Propagation Tear Resistance of Plastic Film and Thin Sheeting by Pendulum Method" (1993 Edition), 5 pages.

Naguib et al., "Effect of Supercritical Gas on Crystallization of Linear and Branched Polypropylene Resins with Foaming Additives", Ind. Eng. Chem. Res., 44 (2005), 6685-6691.

Tabatabaei et al., "Rheological and thermal properties of blends of a long-chain branched polypropylene and different linear polypropylenes", Chemical Engineering Science, 64 (2009), 4719-4731.

(56) References Cited

OTHER PUBLICATIONS

Almanza et al., "Applicability of the Transient Plane Source Method to Measure the Thermal Conductivity of Low-Density Polyethylene Foams", Journal of Polymer Science: Part B: Polymer Physics, vol. 42 (2004), 1226-1234.
The Burn Foundation, "Scald Burns", available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
"Power of a Microwave Oven", available at https://web.archive.org/web/20071010183358/http://hypertextbook.com/facts/2007/TatyanaNektalova.shtml, dated Oct. 10, 2007, accessed on Feb. 5, 2016.
Health Physics Society, "Microwave Oven Q & A", available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., "Heat Transfer in Polypropylene-Based Foams ProducedUsing Different Foaming Processes", Advanced Engineering Materials, 11, No. 10 (2009), 811-817
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of Hifax CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry\s Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
Borealis Product Brochure, Daploy HMS Polypropylene for Foam Extrusion (2010), 20 pages.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
M. Antunes et al., "Heat Transfer in Polyolefin Foams," Heat Transfer in Multi-Phase Materials, A. Öchsner and G. E. Murch, Eds. Springer-Verlag Berlin Heidelberg, 2011, 131-161.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, Apr. 27, 2016, 5 pages.
Japanese Office Action for Japanese Patent Application No. 2014-528384, dated Mar. 1, 2016.
English Summary of Chinese Office Action for Application Serial No. 201380041896.1, dated Mar. 18, 2016, 7 pages.
Doerpinghaus et al., "Separating the effects of sparse long-chain branching on rheology from those due to molecular weight in polyethylenes", Journal of Rheology, 47, 717 (2003).
English Summary of Chinese Office Action for Application Serial No. 201280051426.9, Apr. 29, 2016, 5 pages.
English translation of Japanese Office Action for Japanese Application No. 2014-516089, dated May 10, 2016.
Third Party Submission Under 37 CFR 1.290 filed on May 12, 2016 in U.S. Appl. No. 14/739,510.
Daploy HMS Polypropylene for Foam Extrusion, 20 pages, Borealis Borouge Shaping the Future with Plastics, Published 2010, www.borealisgroup.com, www.borouge.com, Vienna, Austria.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written opinion dated May 27, 2016 for Singapore Application No. 11201504327V.
Office Action dated Jun. 10, 2016 for U.S. Appl. No. 14/188,504.
Office Action dated Mar. 10, 2016 for U.S. Appl. No. 14/462,073.
Notice of Acceptance dated Jun. 10, 2016 for Australian Application No. 2012302251.
Office Action for Chinese Patent Application No. 201380065116.7, dated Jun. 28, 2016, including English language summary, 12 pages.
Australian First Patent Examination Report for Application No. 2013334155, dated May 23, 2016, 4 pages.
Extended European Search Report for European Application No. 13862331.9-1708 / 2931627 PCT/US2013/074923, dated Jul. 7, 2016.
English translation of Russian Office Action for Application Serial No. 2014101298, dated Jul. 22, 2016, 7 pages.
Office Action dated Oct. 8, 2015 for U.S. Appl. No. 14/188,504.
Second Chinese Office Action dated Sep. 6, 2015 for Chinese Application Serial No. 201280034350.9.
Office Action dated Oct. 27, 2015 for U.S. Appl. No. 14/462,073.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
English translation of Russian Office Action for Application Serial No. 2015127677, dated Sep. 16, 2015.
English Summary of Russian Office Action for Application Serial No. 2014111340, dated Feb. 25, 2016, 8 pages.
United Kingdom Examination Report for Patent Application No. GB1400762.9 dated Feb. 11, 2016.
Office Action dated Feb. 16, 2016 for U.S. Appl. No. 14/108,142.
Extended European Search Report for European Application No. 13849152.7-1303 / 2912142 PCT/US2013/066811, dated Feb. 12, 2016.
English summary of Spanish Office Action for Application Serial No. P201490025, Feb. 9, 2016, 8 pages.
Supplemental European Search Report for European Application No. 12727994.1-1302, dated Feb. 17, 2016.

(56) References Cited

OTHER PUBLICATIONS

Office Action dated Sep. 1, 2016 for U.S. Appl. No. 14/106,212.
Australian First Patent Examination Report for Application No. 2013359097 sent Aug. 26, 2016, 3 pages.
British Examammination Report for GB Application No. GB1400762.9, sent on Aug. 8, 2016, 2 pages.
Extended European Search Report for European Application No. 13863546.1 established Jul. 12, 2016, 7 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Taiwan Office Action for Taiwan Pat. App. No. 102146299, 7 pages.
Third Party Observation filed in European Patent App. No. 12727994.1, BP-356 EP ||, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4, BP-354 GB-DIV ||, 4 pages.
British Examination Report for GB App. No. 1400762.9, BP-354 GB ||, 2 pages.
Chinese Office Action for Chinese Applicaiton 201380065781.6, BP-395 CN ||, 33 pages.
Research Progress of Polypropylene Foamed Material, Baiquan Chen et al., Plastics Manufacture, No. 12, pp. 55-58.
Extended European Search Report for European App. No. 13863649.3, BP-445 EP ||, 9 pages.
Office Action dated Nov. 4, 2016 for U.S. Appl. No. 13/961,411.
Chinese Office Action for Chinese Application No. 201280051426.9, BP-356 CN ||, 9 pages.
English Summary of Chinese Office Action for Application Serial No. 201380041896.1, dated Nov. 11, 2016, BP-386 CN ||, 11 pages.
Extended European Search Report for European App. No. 14775300.8 sent Oct. 24, 2016, BP-392 EP ||, 9 pages.
Office Action dated Nov. 18, 2016 for U.S. Appl. No. 14/718,836.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529, BP-354 GCC ||, 6 pages.
Office Action dated Dec. 28, 2016 for U.S. Appl. No. 14/106,276.
Inter Partes Review Petition for U.S. Pat. No. 8,883,280 (712 pages).
Borealis webpage dated Jan. 20, 2010 from Internet Archive (6 pages).
Gibson and Ashby, Cellular solids: structure and properties, 2nd ed., Cambridge University Press (1997) (7 pages).
C. Maier and T. Calafut, Polypropylene: the Definitive User\s Guide and Databook, Plastics Design Library, William Andrew Inc. (1998) (19 pages).
Reichelt et al., Cellular Polymers, vol. 22, No. 5 (2003) (14 pages).
Ratzsch et al., Prog. Polym. Sci., 27 (2002), 1195-1282 (88 pages).
Encyclopedia of Polymer Science and Technology: Plastics, Resins, Rubbers, and Fibers, vol. 2, John Wiley & Sons, Inc. (1965) (37 pages).

Shau-Tarng Lee, Chul B. Park, and N.S. Ramesh, Polymer Foams: Science and Technology, CRC Press (2007) (51 pages).
Grant & Hackh\s Chemical Dictionary, 5th ed., McGraw-Hill, Inc. (1987) (3 pages).
Merriam-Webster\s Collegiate Dictionary, 11th ed. (2003), p. 70 (3 pages).
Merriam-Webster\s Collegiate Dictionary, 11th ed. (2003), p. 1237 (3 pages).
Hawley\s Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournals.com/journals.asp?Page=111&JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly HMS Polypropylene for Foam Extrusion" obtained from Borealis webpage obtained from the Internet Arcive\s "Wayback Machine" Nov. 16, 2008 (https://web.archive.org/web/20081116085125/http://www.borealisgroup.com/pdf/literature/boreais-borouge/brochure/K_IN0020_GB_FF_2007_10_BB.pdf ("Brochure \08") (20 pages).
Office Action dated Jan. 4, 2017 for U.S. Appl. No. 14/108,110.
Spanish Search Report for Spanish App. No. 201490025 received Dec. 23, 2016, 5 pages.
Japanese Office Action for Japanese Patent App. 2014-516089 sent Dec. 20, 2016, 6 pages.
European Examination Report for European App. No. 12727994.1 received on Jan. 25, 2016, 4 pages.
Japanese Office Action for Japanese App. No. 2014-528384 received Dec. 6, 2016, 15 pages.
Singapore Office Action and Written Opinion received Feb. 6, 2017 for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 sent Jan. 30, 2017, 3 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 mailed Feb. 28, 2017, 16 pages.
New Zealand First Examination Report for New Zealand Application 708546 received Feb. 23, 2017, 2 pages.
Singapore Office Action and Written Opinion dated Dec. 13, 2016 and received on Feb. 28, 2017 for Singapore Application No. 11201504333Y, 6 pages.
Office Action for Chinese Patent Application No. 201380065116.7, dates Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action mailed Mar. 10, 2017 for Chinese Patent Application 201480007369.3, 11 pages.
New Zealand Examination Report for New Zealand Application No. 708463 received 16 Mar. 17, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 mailed Feb. 23, 2017, 6 pages.

* cited by examiner

PROCESS FOR FORMING AN INSULATED CONTAINER HAVING ARTWORK

PRIORITY CLAIM

This application is a continuation of U.S. application Ser. No. 14/718,836, filed May 21, 2015, which is a continuation of U.S. application Ser. No. 13/526,454, filed Jun. 18, 2012, which claims priority under 35 U.S.C. §119(e) to U.S. Provisional Application Ser. No. 61/498,415, filed Jun. 17, 2011; U.S. Provisional Application Ser. No. 61/618,637, filed Mar. 30, 2012; U.S. Provisional Application Ser. No. 61/498,435, filed Jun. 17, 2011; U.S. Provisional Application Ser. No. 61/618,632, filed Mar. 30, 2012; U.S. Provisional Application Ser. No. 61/498,455, filed Jun. 17, 2011; U.S. Provisional Application Ser. No. 61/618,587, filed Mar. 30, 2012; U.S. Provisional Application Ser. No. 61/600,388, filed Feb. 17, 2012; U.S. Provisional Application Ser. No. 61/618,614, filed Mar. 30, 2012; U.S. Provisional Application Ser. No. 61/618,620, filed Mar. 30, 2012; U.S. Provisional Application Ser. No. 61/529,632, filed Aug. 31, 2011; and U.S. Provisional Application Ser. No. 61/618,604, filed Mar. 30, 2012; and is a continuation-in-part of U.S. Non-Provisional application Ser. No. 13/491,007, filed Jun. 7, 2012 and is a continuation-in-part of U.S. Non-Provisional application Ser. No. 13/491,327, filed Jun. 7, 2012, each of which is expressly incorporated by reference herein.

BACKGROUND

The present disclosure relates to containers, and in particular to insulated containers, such as cups, for containing hot or cold beverages or food. More particularly, the present disclosure relates to an insulated container having a printable surface.

SUMMARY

A vessel in accordance with the present disclosure is configured to hold a product in an interior region. In illustrative embodiments, the vessel is an insulated container such as a drink cup, a food-storage cup, or a dessert cup.

In illustrative embodiments, a process for forming an insulative cup includes the steps of providing a strip of insulative cellular non-aromatic polymeric material, printing graphics on the strip to form a printed strip, and converting the printed strip into an insulative cup. The insulative cup is formed to include an interior region and the insulative cellular non-aromatic polymeric material is located between the graphics and the interior region of the insulative cup.

In illustrative embodiments, an insulative cup includes a body having a sleeve-shaped side wall and a floor coupled to the body to cooperate with the side wall to form an interior region for storing food, liquid, or any suitable product. The body also includes a rolled brim coupled to an upper end of the side wall and a floor mount coupled to a lower end of the side wall and to the floor.

In illustrative embodiments, text and artwork are printed directly on an exterior surface of a strip insulative cellular non-aromatic polymeric material that is used to form the body of the insulative cup. In illustrative embodiments, the floor also comprises insulative cellular non-aromatic polymeric material.

The insulative cellular non-aromatic polymer material included in the body is configured in accordance with the present disclosure to provide means for enabling localized plastic deformation in at least one selected region of the body (e.g., the side wall, the rolled brim, the floor mount, and a floor-retaining flange included in the floor mount) to provide (1) a plastically deformed first material segment having a first density in a first portion of the selected region of the body and (2) a second material segment having a relatively lower second density in an adjacent second portion of the selected region of the body. In illustrative embodiments, the denser first material segment is thinner than the second material segment.

In illustrative embodiments, the insulative cellular non-aromatic polymeric material comprises a polypropylene base resin having a high melt strength, a polypropylene copolymer or a homopolymer resin (or both), and cell-forming agents including primary and secondary nucleating agents and a blowing agent such as carbon dioxide gas that is injected into the resins to expand the resins and reduce density. The base resin comprises broadly distributed molecular weight polypropylene characterized by a distribution that is unimodal (not bimodal).

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic and perspective view of a cup-manufacturing process in accordance with the present disclosure showing that the cup-manufacturing process includes the stages of providing a strip of insulative cellular non-aromatic polymeric material, printing on the strip to form a printed strip as shown, for example, in FIG. 9, and forming an insulative cup shown, for example, in FIG. 11, from the printed strip;

FIGS. 2-8 illustrate various processes in accordance with the present disclosure for forming an insulative cup made of a printed strip comprising ink printed on a strip of insulative cellular non-aromatic material;

FIG. 2 is a perspective and diagrammatic view of the cup-forming stage of the cup-manufacturing process of FIG. 1 showing that the cup-forming stage includes the steps of providing a printed strip, forming an insulative cup as suggested in detail in FIGS. 3-5, and packaging stacks of insulative cups as suggested in detail in FIG. 6 and showing that forming an insulative cup includes the steps of forming a body blank as suggested in detail in FIG. 3, annealing the body blank, forming a cup base as suggested in detail in FIG. 4, and forming a rolled brim as suggested in detail in FIG. 5;

FIG. 3 is a perspective and diagrammatic view of the body blank forming step showing that the body blank forming step includes the steps of loading the a roll to provide the printed strip, annealing the printed strip, compressing the printed strip to form a compressed printed strip, cutting the compressed printed strip to form body blanks and scrap, collecting scrap, and accumulating the body blanks to form body blank stacks;

FIG. 4 is a perspective and diagrammatic view of the cup-base forming step showing that the cup-base forming step includes the steps of loading body blank stacks, heating the body blank, wrapping the body blank around a mandrel, forming a body, loading another roll to provide the printed strip, cutting the printed strip to provide floor blanks and scrap, shaping the floor blanks into a floor, heating the floor, heating the body, wrapping the body around the floor, and coupling the floor to the base to establish a cup body;

Figure 1:
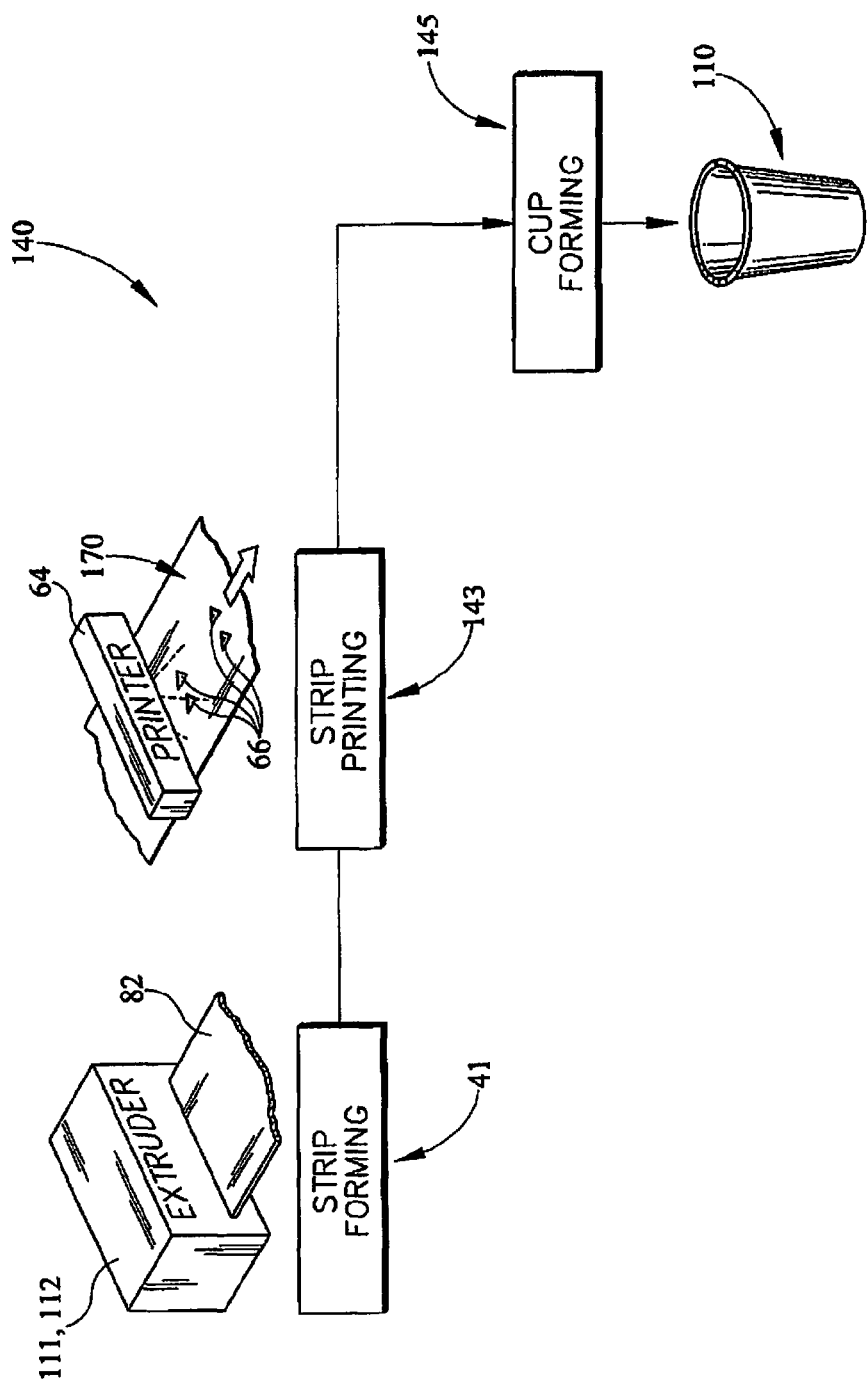
Figure 2:
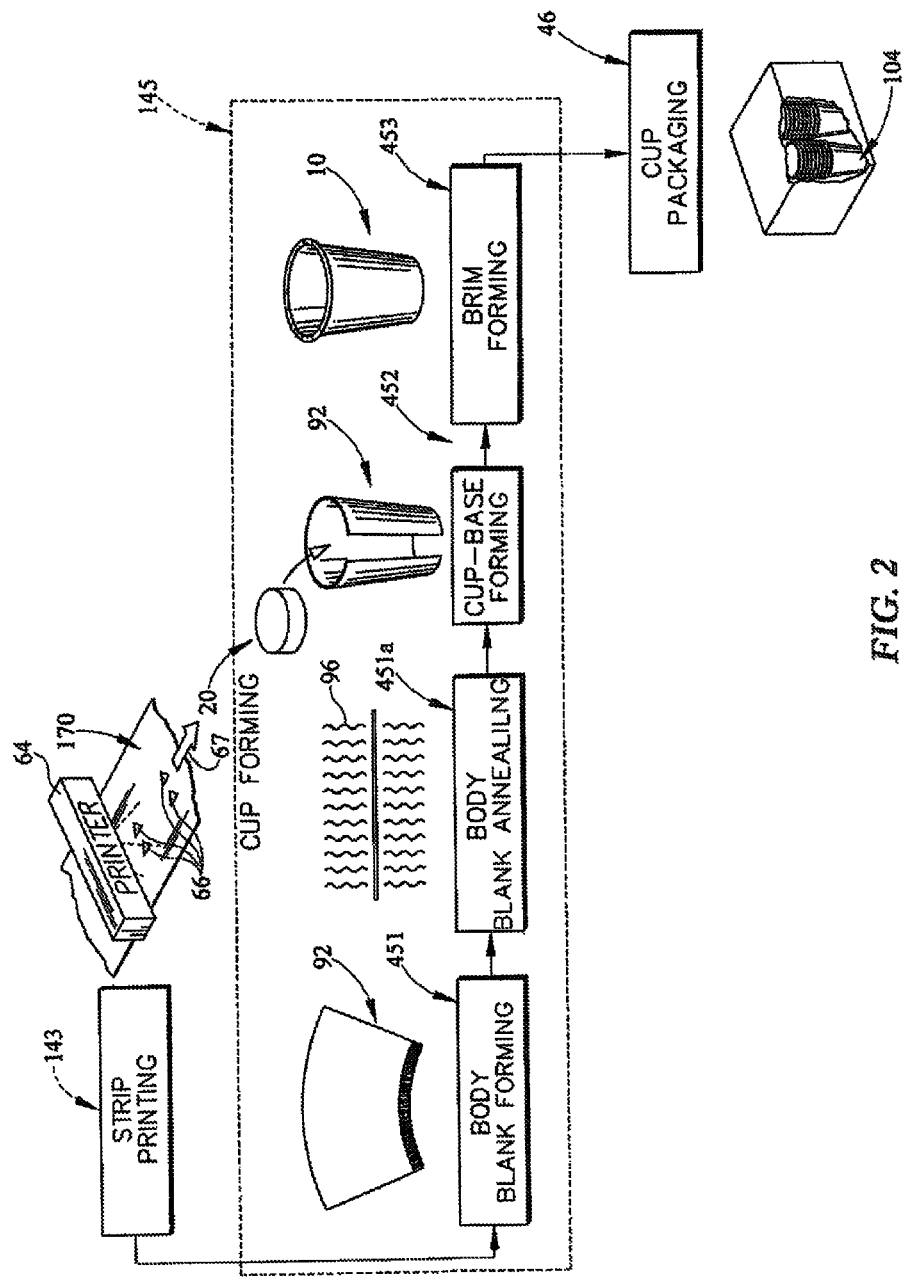
Figure 7:
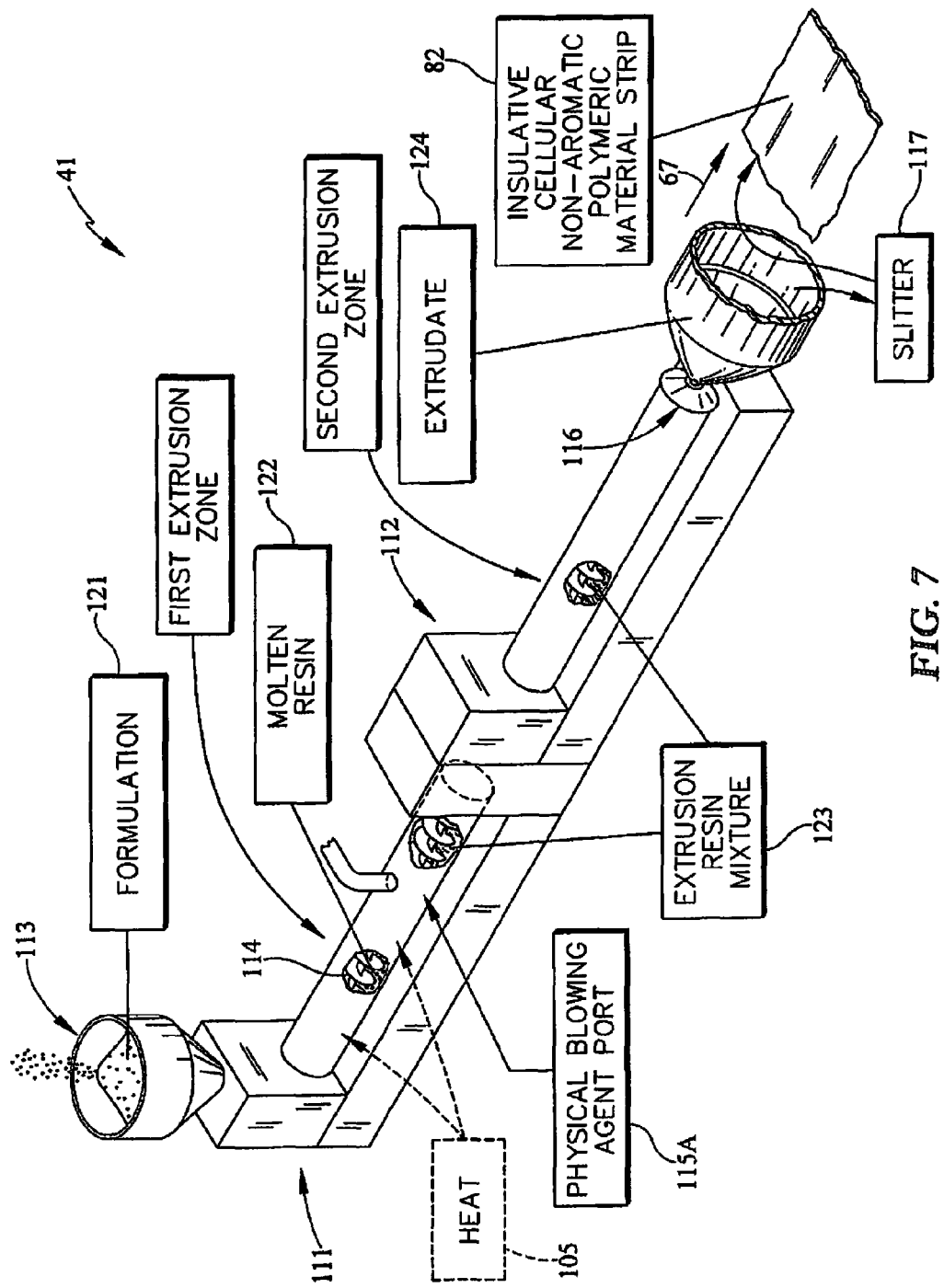
Figure 8:
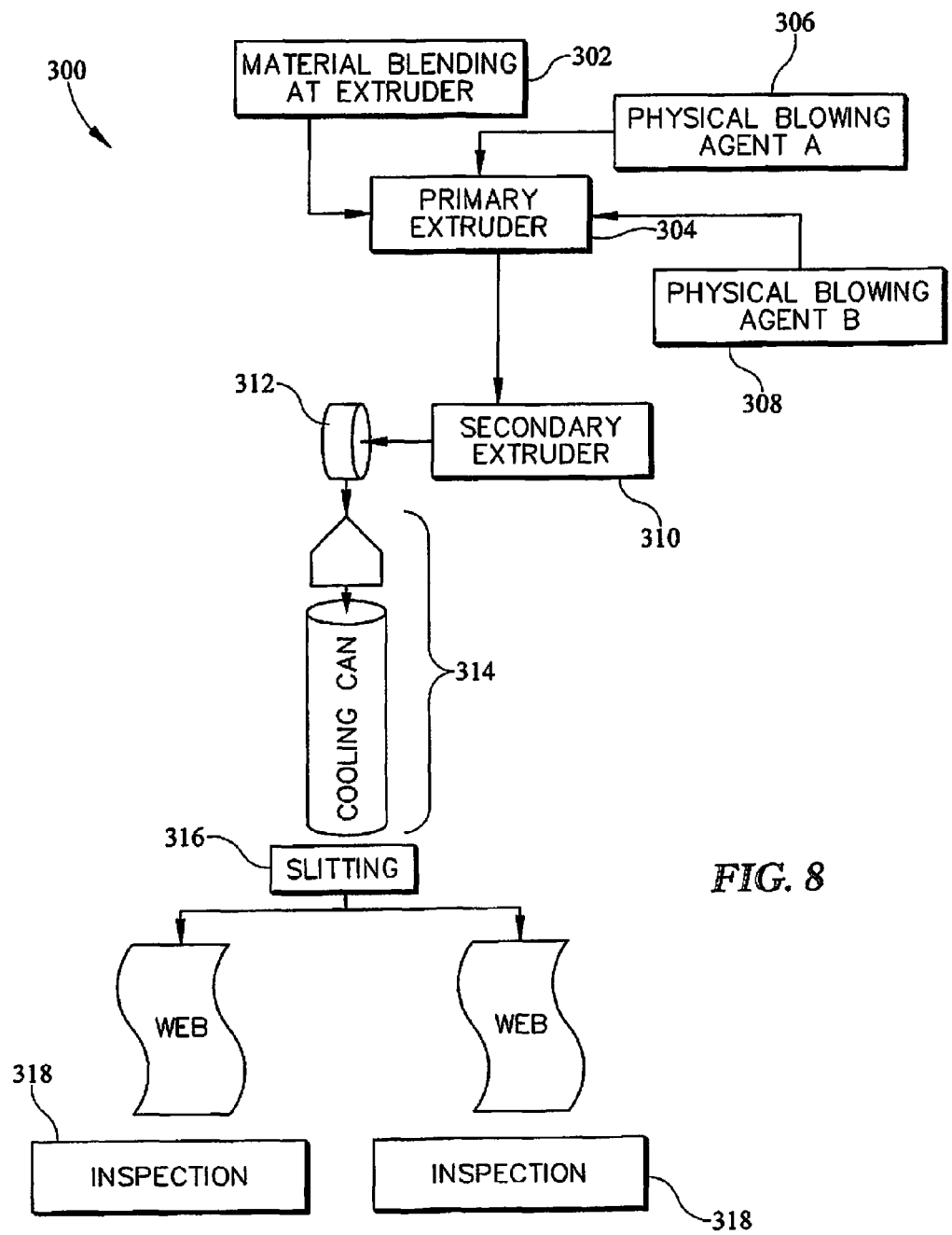
Figure 9:
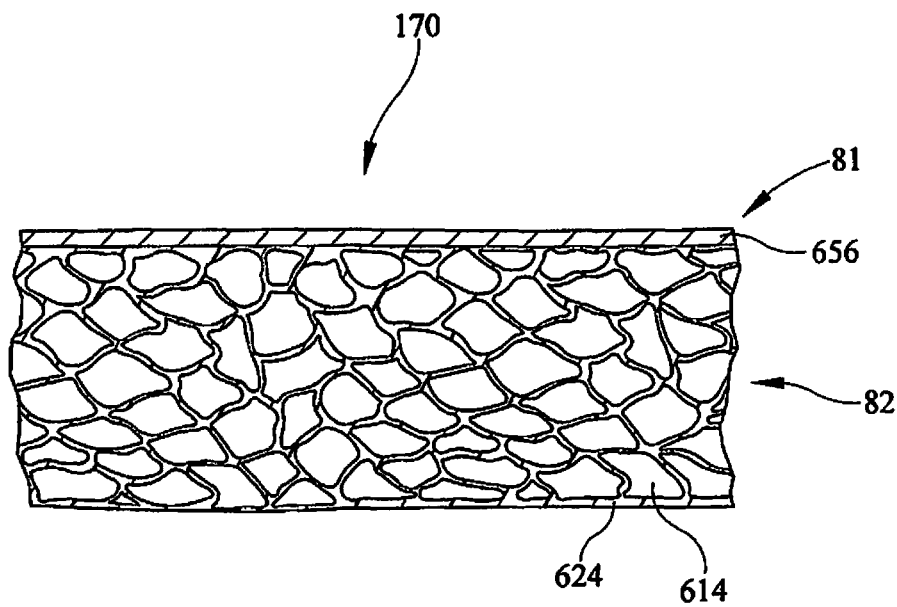
Figure 10:
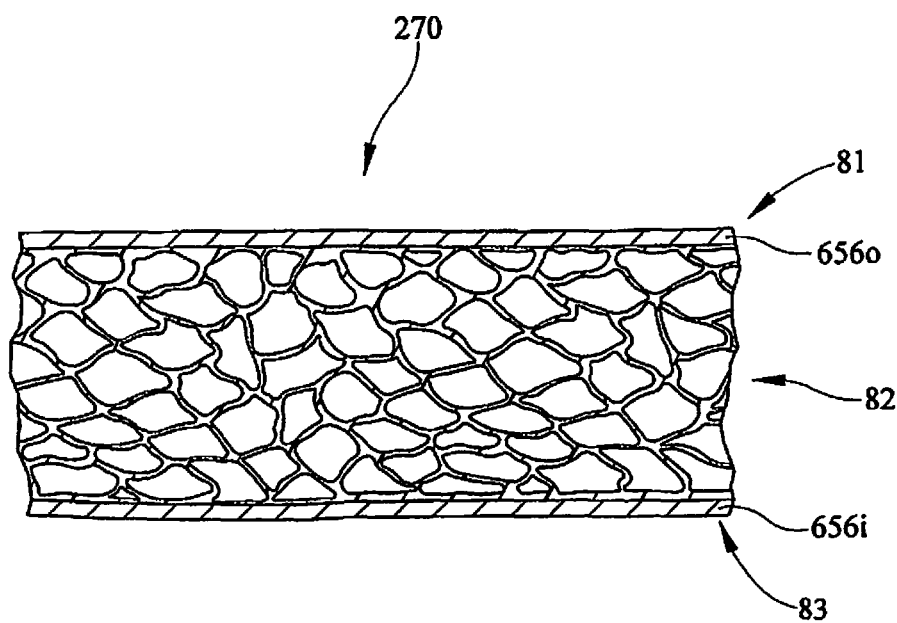
Figures 11, 12:
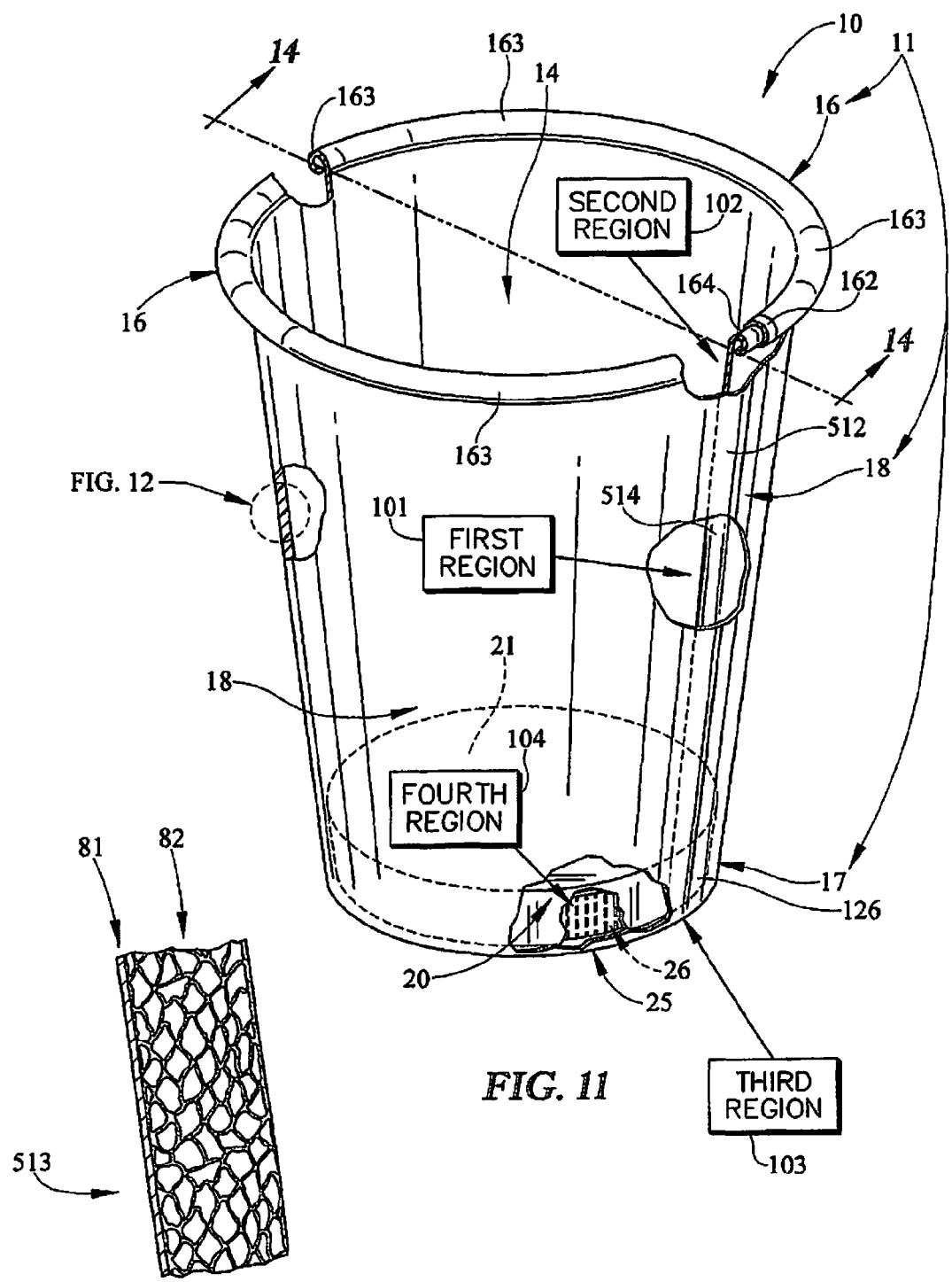
Figure 13:
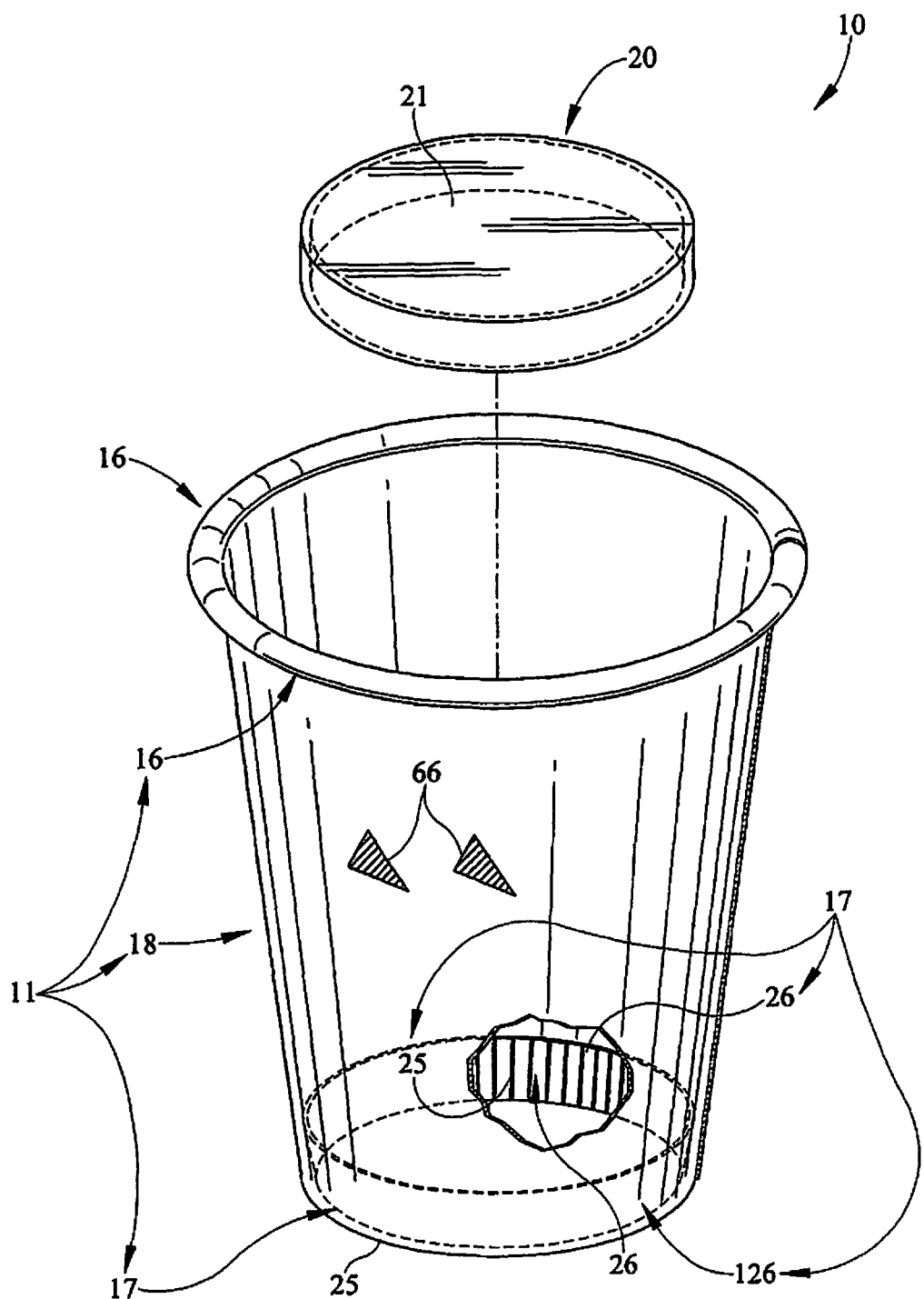
Figure 14:
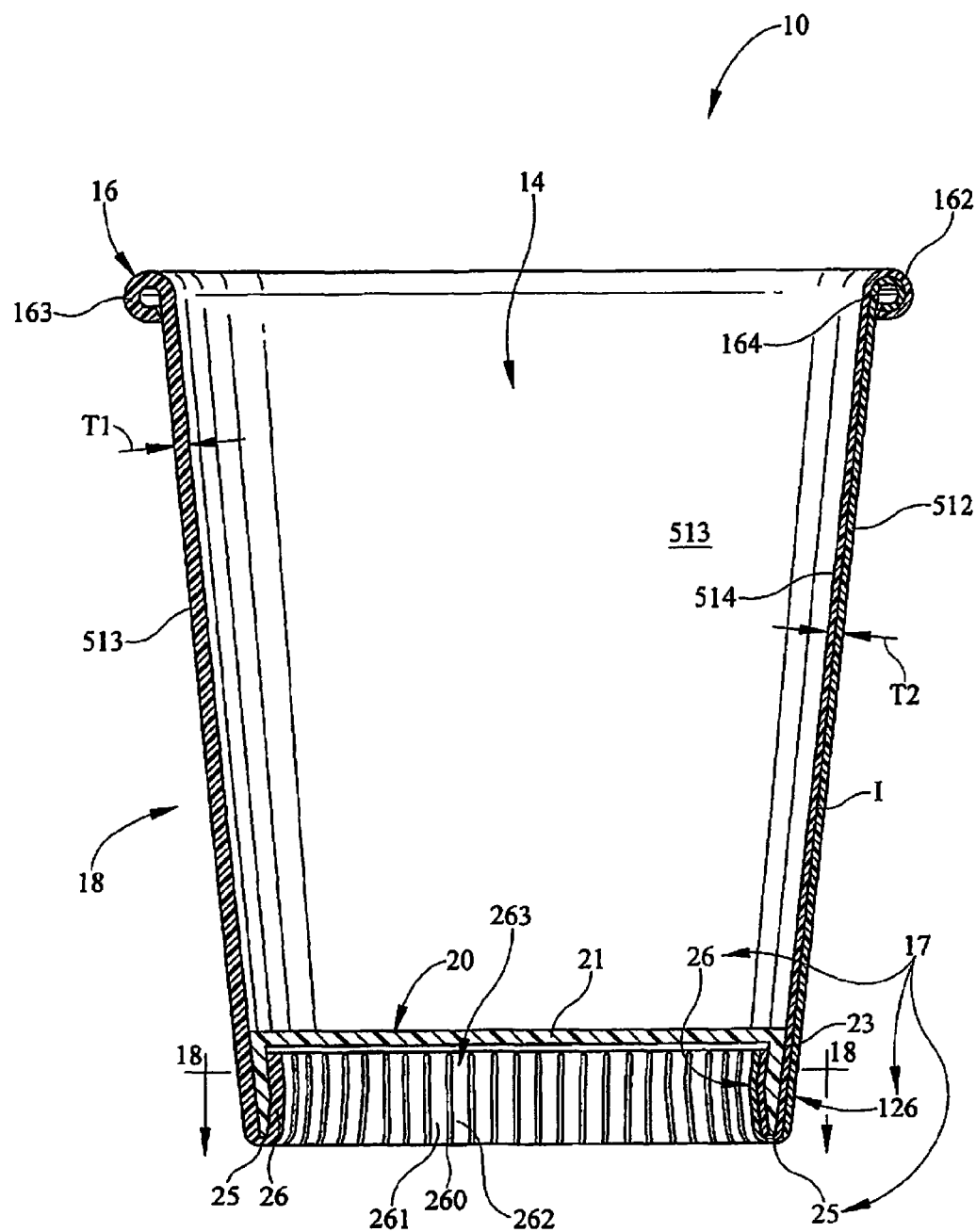
Figure 15:
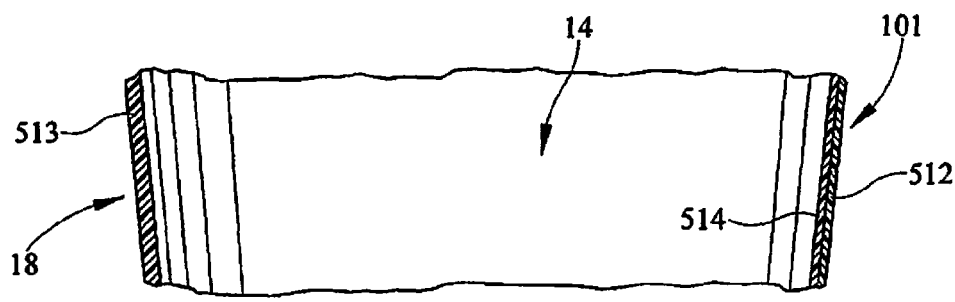
Figure 16:
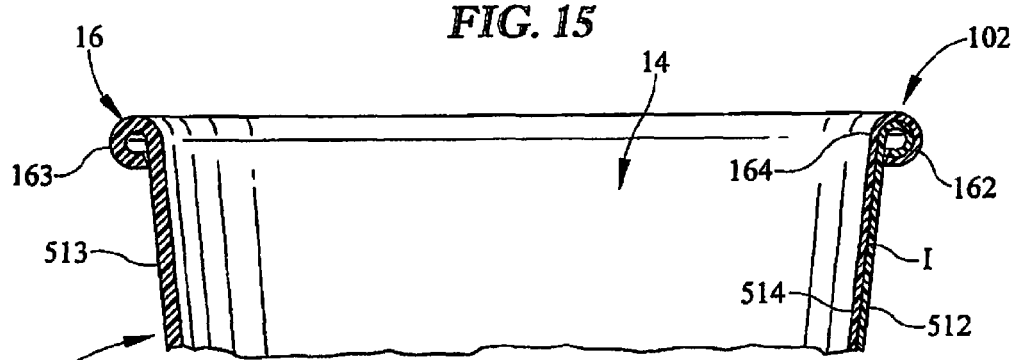
Figure 17:
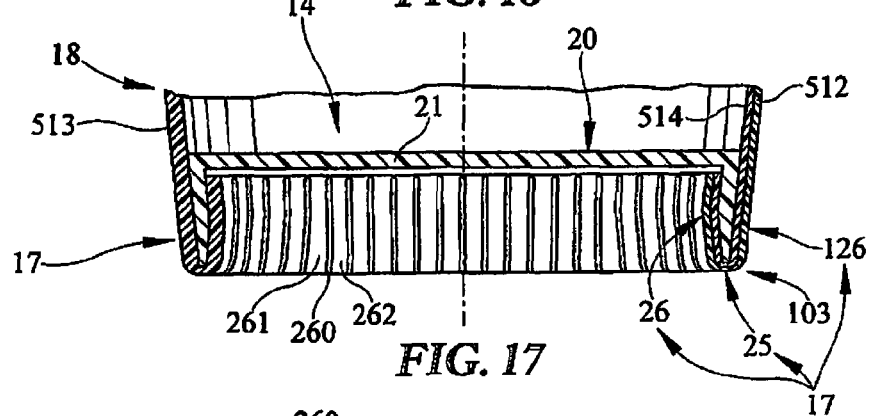
Figure 18:
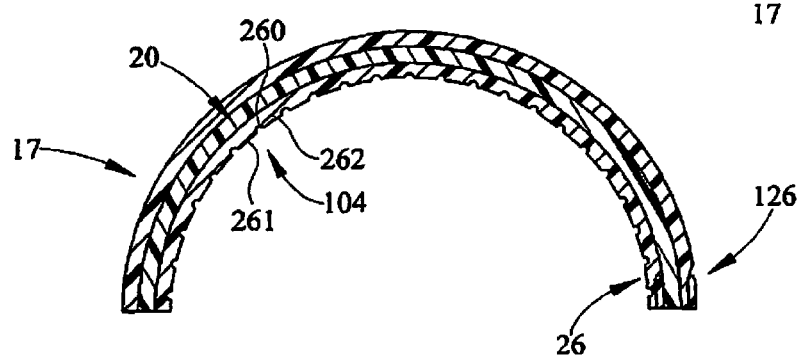
Figure 19:
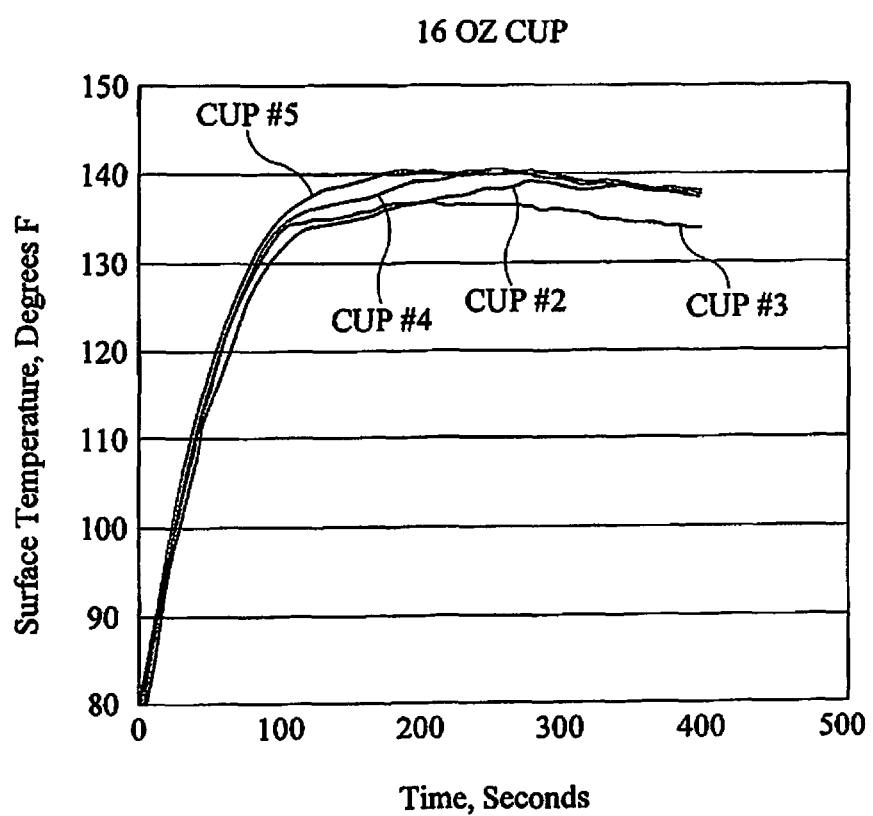

FIG. 7 is a diagrammatic and perspective view of a first embodiment of a strip-forming stage in accordance with the present disclosure showing, from left to right, placing a formulation of insulative cellular non-aromatic polymeric material being placed into a hopper that is fed into a first extrusion zone of a first extruder where heat and pressure are applied to form molten resin and showing that a blowing agent is injected into the molten resin to form an extrusion resin mixture that is fed into a second extrusion zone of a second extruder where the extrusion resin mixture exits and expands to form an extrudate which is slit to form a strip of insulative cellular non-aromatic polymeric material;

FIG. 8 is a perspective and diagrammatic view of another embodiment of a strip-forming stage in accordance with the present disclosure showing the extruding stage in which two strips of insulative cellular non-aromatic polymeric material are formed using a tandem extrusion setup;

FIG. 9 is an enlarged sectional view of a first embodiment of a printed strip in accordance with the present disclosure made using the process shown in FIGS. 1-7 showing that the printed strip includes, from top to bottom, an ink layer and the strip of insulative cellular non-aromatic polymeric material;

FIG. 10 is a view similar to FIG. 9 showing another embodiment of a printed strip in accordance with the present disclosure wherein the printed strip includes, from top to bottom, an outer ink layer, a strip of insulative cellular non-aromatic polymeric material, and an inner ink layer;

FIG. 11 is a perspective view of an insulative cup made from a strip of material including the insulative cellular non-aromatic polymeric material made using the cup-manufacturing process shown in FIGS. 1-6 showing that the insulative cup includes a body and a floor and showing that four regions of the body have been broken away to reveal localized areas of plastic deformation that provide for increased density in those areas while maintaining a predetermined insulative characteristic in the body;

FIG. 12 is an enlarged sectional view of a portion of a side wall included in the body of the insulative cup of FIG. 11 showing that the side wall is made from the printed strip that includes, from left to right, the skin including the ink layer and the strip of insulative cellular non-aromatic polymeric material;

FIG. 13 is an exploded assembly view of the insulative cup of FIG. 11 showing that the insulative cup includes, from top to bottom, the floor and the body including a rolled brim, the side wall, and a floor mount configured to interconnect the floor and the side wall as shown in FIG. 11;

FIG. 14 is a sectional view taken along line 14-14 of FIG. 1 showing that the side wall included in the body of the insulative cup includes a generally uniform thickness and that the floor is coupled to the floor mount included in the body;

FIGS. 15-18 are a series views showing first, second, third, and fourth regions of the insulative cup of FIG. 11 that each include localized plastic deformation;

FIG. 15 is a partial section view taken along line 14-14 of FIG. 11 showing the first region is in the side wall of the body;

FIG. 16 is a partial section view taken along line 14-14 of FIG. 11 showing the second region is in the rolled brim of the body;

FIG. 17 is a partial section view taken along line 14-14 of FIG. 11 showing the third region is in a connecting web included in the floor mount of the body;

FIG. 18 is a partial section view taken along line 14-14 of FIG. 11 showing the fourth region is in a web-support ring included in the floor mount of the body; and FIG. 19 is a graph showing performance over time of insulative cups in accordance with the present disclosure undergoing temperature testing.

DETAILED DESCRIPTION

A cup-manufacturing process 140 comprising a process for forming an insulative cup 10 having artwork in accordance with the present disclosure is shown, for example, in FIGS. 1-6. An insulative cup 10 in accordance with the present disclosure is shown, for example, in FIGS. 11-18. Insulative cup 10 is made from a printed strip 170 formed during cup-manufacturing process 140 as suggested in FIGS. 11-18. As an example, printed strip 170 includes ink printed on a strip 82 of insulative cellular non-aromatic polymeric material as shown in FIG. 9. Another embodiment of a printed strip 270 in accordance with the present disclosure is shown in FIG. 10. Two embodiments of a strip-forming stage 41 and 300 used in a cup-manufacturing process are shown, for example, in FIGS. 7 and 8.

Cup-manufacturing process 140 includes a strip-forming stage 41, a strip-printing stage 143, and a cup-forming stage 145 as shown, for example, in FIG. 1. Strip-forming stage 41 forms and provides a strip 82 of insulative cellular non-aromatic polymeric material as suggested in FIGS. 7 and 8. Strip-printing stage 143 prints artwork such as graphics and text 66 on strip 82 to provide a printed strip 170 as shown in FIG. 1. Cup-forming stage 145, also called a converting step, forms insulative cup 10 from printed strip 170 as shown for example in FIGS. 2-6.

Insulative cup 10 includes, for example, a body 11 having a sleeve-shaped side wall 18 and a floor 20 as shown in FIGS. 11-18. Floor 20 is coupled to body 11 and cooperates with side wall 18 to form an interior region 14 therebetween for storing food, liquid, or any suitable product. Body 11 also includes a rolled brim 16 coupled to an upper end of side wall 18 and a floor mount 17 coupled to a lower end of side wall 18 and to floor 20 as shown in FIG. 14.

Insulative cellular non-aromatic polymeric material is configured in accordance with the present disclosure to provide means for enabling localized plastic deformation in at least one selected region of body 11 (e.g., side wall 18, rolled brim 16, floor mount 17, and a floor-retaining flange 26 included in floor mount 17) to provide (1) a plastically deformed first material segment having a first density in a first portion of the selected region of body 11 and (2) a second material segment having a relatively lower second density in an adjacent second portion of the selected region of body 11 as suggested, for example, in FIGS. 11 and 15-18.

In illustrative embodiments, the first material segment is thinner than the second material segment.

Strip-printing stage 143 uses a printer 64 to print ink layer 66 on strip 82 to provide a printed strip 170 as shown in FIG. 1. Printing may be done using conventional flexography, which is a form of printing that uses flexible rubber relief plates and highly volatile, fast-drying inks to print on a variety of substrates, including strip 82 of insulative cellular non-aromatic polymeric material. In particular, printing may be done using an in-line, central impression flexographic printing station. Alternatively, printing processes such as rotogravure may be used.

Central impression presses use a large-diameter common impression cylinder to carry the web around to each color station. The advantage of such a press is the ease of maintaining proper registration. The use of larger impression cylinders (i.e., up to 83 inches in diameter) has, in the past, led to an increase in press speed, but as drying methods have improved there is no longer a strict correlation between larger impression cylinders and increased speed. In-line presses are a type of multi-color press in which separate color stations are mounted in a horizontal line from front to back. They can handle a wider variety of web widths than can stack presses, and can also make use of turning bars to flip the web over, allowing easy reverse printing.

Two examples of the type of in-line, central impression flexographic printing stations which may be used in strip-printing stage 143 are the XD and XG series of presses available from the Flexotecnica division of North American Cerutti Corporation in Milwaukee, Wis. Standard press widths are available from 32-60 inches (800-1525 mm) wide. Standard repeats are available at 30 (760), 33 (840) and 43 (1100) inches (mm). Extra large or Mega model of presses are available up to 83 inches (2100 mm) wide with 75 inch (1900 mm) repeats. Line speeds are available up to 1600 fpm (500 mpm), and they may be equipped with in-line vision for registration. They may include up to ten color stations.

The highly volatile, fast-drying inks which may be used in the printing of graphics are radiation-curing inks that dry or set with the application of ultraviolet light. Ultraviolet curing ink vehicles are typically composed of fluid oligomers (i.e., small polymers), monomers (i.e., light-weight molecules that bind together to form polymers), and initiators that, when exposed to ultraviolet radiation, release free radicals (i.e., extremely reactive atoms or molecules that can destabilize other atoms or molecules and start rapid chain reactions) that cause the polymerization of the vehicle, which hardens to a dry ink film containing the pigment.

The most common configuration of Ultraviolet curing equipment is a mercury vapor lamp. Within a quartz glass tube containing charged mercury, energy is added, and the mercury is vaporized and ionized. As a result of the vaporization and ionization, the high-energy free-for-all of mercury atoms, ions, and free electrons results in excited states of many of the mercury atoms and ions. As they settle back down to their ground state, radiation is emitted. By controlling the pressure that exists in the lamp, the wavelength of the radiation that is emitted can be somewhat accurately controlled, the goal being to ensure that much of the radiation that is emitted falls in the ultraviolet portion of the spectrum, and at wavelengths that will be effective for ink curing. Ultraviolet radiation with wavelengths of 365 to 366 nanometers provides the proper amount of penetration into the wet ink film to effect drying. Another variation of radiation-curing inks which may be used in the printing of graphics are electron-beam curing inks. The formulation of such inks is less expensive than Ultraviolet curing inks, but the electron-beam curing equipment is more expensive.

An insulative cellular non-aromatic polymeric material produced in accordance with the present disclosure can be formed to produce insulative cup 10 as suggested in FIGS. 2-9. As an example, the insulative cellular non-aromatic polymeric material comprises a polypropylene base resin having a high melt strength, a polypropylene copolymer or homopolymer (or both), and cell-forming agents including at least one nucleating agent and a blowing agent such as carbon dioxide. As a further example, the insulative cellular non-aromatic polymeric material further comprises a slip agent. The polypropylene base resin has a broadly distributed unimodal (not bimodal) molecular weight distribution.

Insulative cellular non-aromatic material is used during cup-manufacturing process 140 to make insulative cup 10 as suggested in FIGS. 1-6. Reference is hereby made to U.S. application Ser. No. 13/491,007 filed Jun. 7, 2012 and titled INSULATED CONTAINER for disclosure relating to an insulative container made from an insulative cellular non-aromatic polymeric material, which application is hereby incorporated in its entirety herein. Reference is hereby made to U.S. application Ser. No. 13/491,327 filed Jun. 7, 2012 and titled POLYMERIC MATERIAL FOR AN INSULATED CONTAINER for disclosure relating to such insulative cellular non-aromatic polymeric material, which application is hereby incorporated in its entirety herein.

Strip-forming stage 41 of cup-manufacturing process 140 provides strip 82 of insulative cellular non-aromatic polymeric material as shown in FIG. 7. As shown in FIG. 7, a formulation 121 of insulative cellular non-aromatic polymeric material is loaded into a hopper 113 that is coupled to first extruder 111. Formulation 121 of insulative cellular non-aromatic polymeric material is moved from hopper 113 by a screw 114 included in first extruder 111. Formulation 121 is transformed into a molten resin 122 in a first extrusion zone of first extruder 111 by application of heat 105 and pressure from screw 114 as suggested in FIG. 1.

In exemplary embodiments a physical blowing agent may be introduced and mixed into molten resin 122 after molten resin 122 is established. In exemplary embodiments, as discussed further herein, the physical blowing agent may be a gas introduced as a pressurized liquid via a port 115A and mixed with molten resin 122 to form a molten extrusion resin mixture 123, as shown in FIG. 7.

Extrusion resin mixture 123 is conveyed by screw 114 into a second extrusion zone included in second extruder 112 as shown in FIG. 7. There, extrusion resin mixture 123 is further processed by second extruder 112 before being expelled through an extrusion die 116 coupled to an end of second extruder 112 to form an extrudate 124. As extrusion resin mixture 123 passes through extrusion die 116, gas comes out of solution in extrusion resin mixture 123 and begins to form cells and expand so that extrudate 124 is established. As an example, strip-forming stage 41 uses a tandem-extrusion technique in which first and second extruders 111, 112 cooperate to extrude strip 82 of insulative cellular non-aromatic polymeric material.

As an exemplary embodiment shown in FIG. 7, the extrudate 124 may be formed by an annular extrusion die 116 to form a tubular extrudate 124. A slitter 117 then cuts extrudate 124 to establish strip 82 of insulative cellular non-aromatic polymeric material as shown in FIG. 7.

Extrudate means the material that exits an extrusion die. The extrudate material may be in a form such as, but not limited to, a sheet, strip, tube, thread, pellet, granule or other structure that is the result of extrusion of a polymer-based formulation as described herein through an extruder die. For the purposes of illustration only, a printed strip will be referred to as a representative extrudate structure that may be formed, but is intended to include the structures discussed herein. The extrudate may be further formed into any of a variety of final products, such as, but not limited to, cups, containers, trays, wraps, wound rolls of strips of insulative cellular non-aromatic polymeric material, or the like.

As an example, strip 82 of insulative cellular non-aromatic polymeric material is wound to form a roll of insulative cellular non-aromatic polymeric material and stored for later use either in a cup-forming process. However, it is within the scope of the present disclosure for strip 82 of insulative cellular non-aromatic polymeric material to be used in-line with the cup-forming process.

As shown in FIG. 9, printed strip 170 is a composite formed of strip 82 of insulative cellular non-aromatic polymeric material onto which ink layer 656 has been printed on. As an example, printed strip 170 is fed from roll 76 to the cup-forming stage 145 as suggested in FIG. 1 and shown in FIG. 2. Cup-forming stage 145 illustratively includes a body blank forming step 451, an optional body blank annealing step 451a, a cup-base forming step 452, and a brim-forming step 453 as shown in FIG. 11. Body blank forming step 451 uses printed strip 170 to make a body blank 92 as shown in FIG. 12. Cup-base forming step 452 uses body blanks 92 along with another printed strip 170 provided by another roll 76 to form a floor blank 90, form side wall 18, and join side wall 18 to floor 20 to establish base 12 as shown in FIG. 13. Brim-forming step 453 rolls top portion 22 of base 12 to form rolled brim 16 on base 12 as suggested in FIG. 14.

Figure 3:
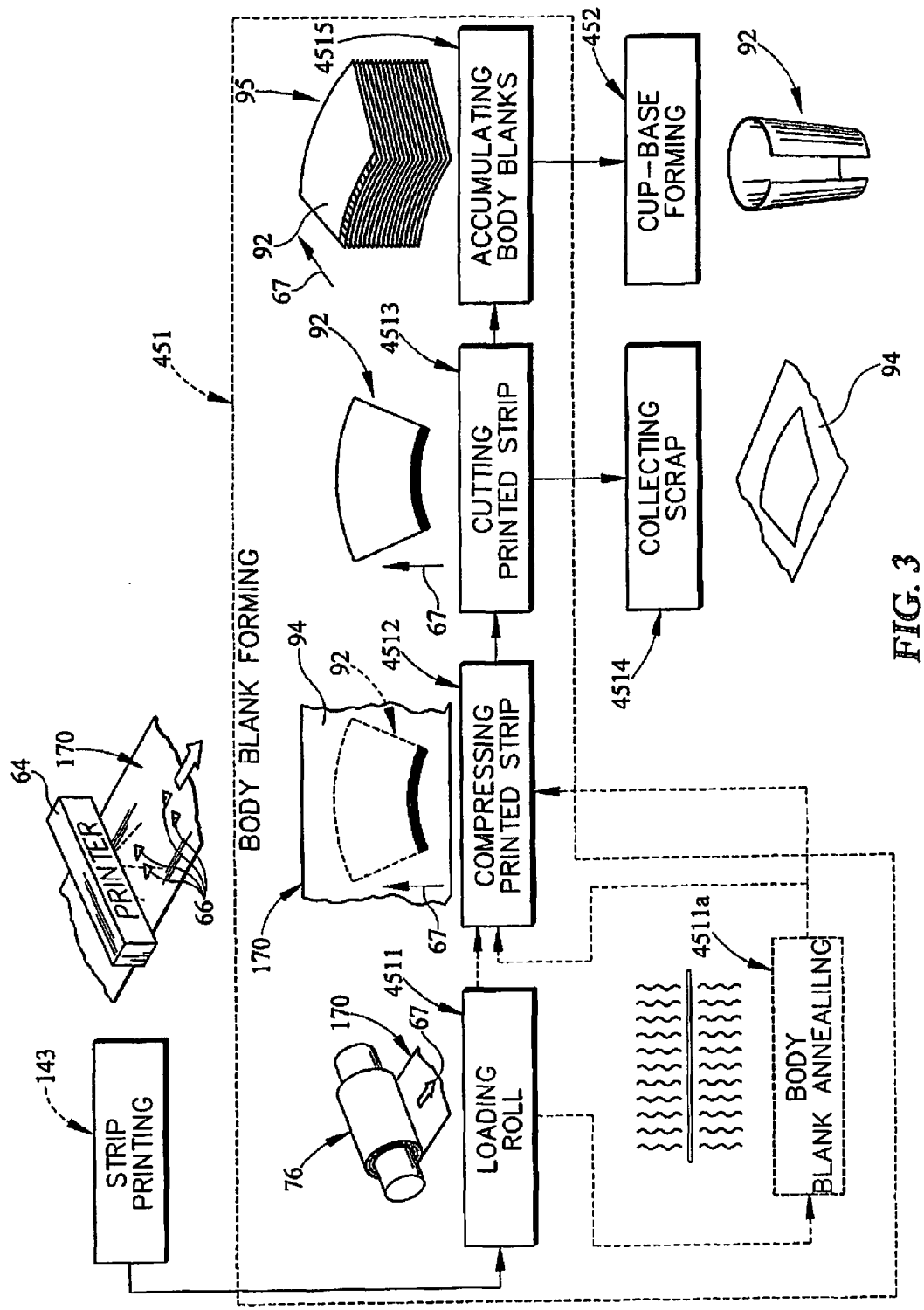

Body blank forming step 451 includes a roll-loading step 4511, an optional annealing step 4511a, a compressing step 4512, a cutting step 4513, a collecting scrap step 4514, and an accumulating blanks step 4515 as shown in FIG. 3. Roll-loading step 4511 loads roll 76 onto a cutting machine such as a die cutting machine or metal-on-metal stamping machine. As a result, printed strip 170 is drawn into the cutting machine for processing in machine direction 67. The optional annealing step 4511a heats printed strip 170 as it moves to the cutting machine so that stresses in the non-aromatic polymer structure of printed strip 170 are released to reduce creasing and wrinkling in surfaces 106 and 108 of insulative cup 10.

An unexpected property of printed strip 170 including strip 82 of insulative cellular non-aromatic polymeric material is its ability to form noticeably smooth, crease, and wrinkle free surfaces when bent to form a round article, such as insulative cup 10. Surface 106 is smooth and wrinkle free as is surface 108 as shown in FIG. 9. The smoothness of the surfaces 106 and 108 of the present disclosure is such that the depth of creases or wrinkles naturally occurring when subjected to extension and compression forces during cup-manufacturing process 140 is less than about 100 microns and even less than about 5 microns in most instances. At less than about 10 microns, the creases or wrinkles are not visible to the naked eye.

In addition to surface topography and morphology, another factor that was found to be beneficial to obtain a high quality insulative cup free of creases was the anisotropy of the insulative cellular non-aromatic polymeric strip. Aspect ratio is the ratio of the major axis to the minor axis of the cell. As confirmed by microscopy, in one exemplary embodiment the average cell dimensions in a machine direction 67 (machine or along the web direction) of an extruded strip 82 of insulative cellular non-aromatic polymeric material was about 0.0362 inches (0.92 mm) in width by about 0.0106 inches (0.27 mm) in height. As a result, a machine direction cell size aspect ratio is about 3.5. The average cell dimensions in a cross direction (cross-web or transverse direction) was about 0.0205 inches (0.52 mm) in width and about 0.0106 inches (0.27 mm) in height. As a result, a cross-direction aspect ratio is about 1.94. In one exemplary embodiment, it was found that for the strip to withstand compressive force during cup forming, one desirable average aspect ratio of the cells was between about 1.0 and about 3.0. In one exemplary embodiment one desirable average aspect ratio of the cells was between about 1.0 and about 2.0.

The ratio of machine direction to cross direction cell length is used as a measure of anisotropy of the extruded strip. In exemplary embodiments, a strip of insulative cellular non-aromatic polymeric material may be bi-axially oriented, with a coefficient of anisotropy ranging between about 1.5 and about 3. In one exemplary embodiment, the coefficient of anisotropy was about 1.8.

If the circumference of the cup is aligned with machine direction 67 of strip 82 with a cell aspect ratio exceeding about 3.0, deep creases with depth exceeding about 200 microns are typically formed on an inside surface of the cup making it unusable. Unexpectedly, it was found, in one exemplary embodiment, that if the circumference of the cup was aligned in the cross direction of extruded strip 82, which can be characterized by cell aspect ratio below about 2.0, no deep creases were formed inside of the cup, indicating that the cross direction of strip 82 was more resistant to compression forces during cup formation.

One possible reason for greater compressibility of an extruded strip with cells having aspect ratio below about 2.0 in the direction of cup circumference, such as in the cross direction, could be due to lower stress concentration for cells with a larger radius. Another possible reason may be that the higher aspect ratio of cells might mean a higher slenderness ratio of the cell wall, which is inversely proportional to buckling strength. Folding of the strip into wrinkles in the compression mode could be approximated as buckling of cell walls. For cell walls with longer length, the slenderness ratio (length to diameter) may be higher. Yet another possible factor in relieving compression stress might be a more favorable polymer chain packing in cell walls in the cross direction allowing polymer chain re-arrangements under compression force. Polymer chains are expected to be preferably oriented and more tightly packed in machine direction 67.

In exemplary embodiments, the cell aspect ratio is about 2.0 when the formed cup circumference is aligned along the direction of the extruded strip. As a result, the surface of extruded strip with crystal domain size below about 100 angstroms facing inside the cup may provide favorable results of achieving a desirable surface topography with imperfections less than about 5 microns deep.

In one aspect of the present disclosure, the polypropylene resin (either the base or the combined base and secondary resin) may have a density in a range of about 0.01 g/cm$^3$ to about 0.19 g/cm$^3$. In one exemplary embodiment, the density may be in a range of about 0.05 g/cm$^3$ to about 0.19 g/cm$^3$. In one exemplary embodiment, the density may be in a range of about 0.1 g/cm$^3$ to about 0.185 g/cm$^3$.

It has been found during development of the present disclosure that if the circumference of insulative cup 10 is aligned with the machine direction 67 of strip 82 of insulative cellular non-aromatic polymeric material, deep creases with a depth in excess of about 200 microns are typically formed on surface 108. Unexpectedly, it has been determined that if the circumference of insulative cup 10 is aligned generally perpendicular to machine direction 67, no deep creases are formed on surface 108, indicating that the cross-direction to machine direction 67 of extruded insulative cellular non-aromatic polymeric material is resistant to compression forces during formation of insulative cup 10. It is believed that this is a result of the orientation of the polymer chains of extruded insulative cellular non-aromatic polymeric material which are oriented and more tightly packed in machine direction 67.

As an example, equipment may be arranged such that rolled brim 16 of insulative cup 10 is arranged to be the cross direction during body blank forming step 451. After printed strip 170 is provided, compressing step 4512 compresses portions of printed strip 170 to form a compressed printed strip. Cutting step 4513 cuts compressed printed strip to cause body blank 92 to be cut from a blank carrier 94. Collecting scrap step 4514 collects blank carrier 94 after cutting step 4513 is complete so that blank carrier 94 may be recycled. Accumulating blanks step 4515 accumulates each body blank 92 to form a body blank stack 95 for use in cup-base forming step 452 as shown in FIG. 3. As another example, compressing step 4512 and cutting step 4513 may be combined such that they are performed generally at the same time by the same piece of equipment.

Figure 4:
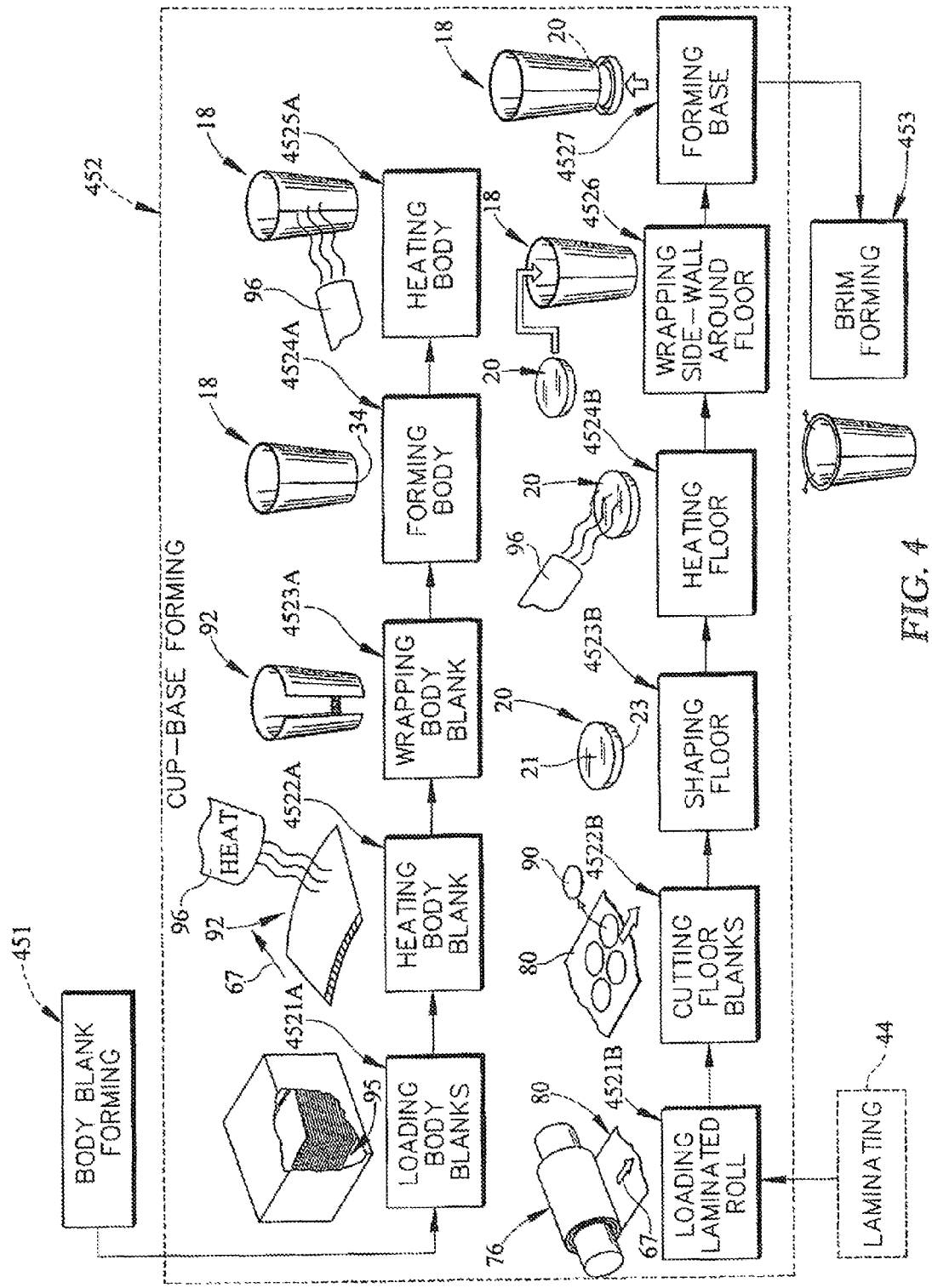

Cup-base forming step 452 includes a body blanks loading step 4521A, a heating body blank step 4522A, a wrapping body blank step 4523A, a forming body step 4524A, a roll loading step 4521B, a cutting floor blanks step 4522B, a shaping floor step 4523B, a heating floor step 4524B, a heating body step 4525A, a wrapping body step 4526, and a floor-seam forming step 4527 as shown in FIG. 4. Body blanks loading step 4521A loads body blank stack 95 into a cup-forming machine for further processing. Heating body blank step 4522A applies heat 96 to body blank 92. Wrapping body blank step 4523A wraps heated body blank 92 around a mandrel included in the cup-forming machine. Forming body step 4524A forms body 11 by compressing portions of side wall 18 using primary and auxiliary seam clamps included in the cup-forming machine. Primary and auxiliary seam clamps provide localize compression which results a portion of side wall 18 having thickness T2 and another portion having thickness T1 as shown in FIG. 14. As an example, thickness T2 is about equal to thickness T1.

Roll-loading step 4521B loads another roll 76 onto the cup-forming machine to cause printed strip 170 to be drawn into cup-forming machine for processing. Cutting floor blanks step 4522B cuts printed strip 170 to cause floor blank 90 to be cut from a blank carrier 94. Blank carrier 94 may then be collected and recycled. Shaping floor step 4523B forms floor 20 by inserting floor blank 90 into the mandrel of the cup-forming machine. Heating floor step 4524B applies heat 96 to floor 20 at the same time heating body step 4525A applies heat 96 to side wall 18. Wrapping body 4526 wraps support structure 19 around platform-support member 23 of floor 20. Floor-seam forming step 4527 compresses floor 20 and side wall 18 to establish a floor seam or seal between floor 20 and side wall 18 to establish base 12 which is then ready for brim-forming step 453 as shown in FIG. 4.

Cup-base forming step 452 maintains the thickness T1 of the side wall 18 as compared to a thermoforming process. Rather than heating an insulative cellular non-aromatic polymeric material and working it over a mandrel in the thermoforming process, subjecting portions of the wall of the resulting cup to thinning and potentially reducing the insulative and structural properties thereof, cup-base forming step 452 is an assembly process that does not require most of the entire side wall 18 to be subjected to melting temperatures. This provides the advantage of maintaining consistency in thickness T1 of side wall 18 and, thereby, consistent and maximized insulating properties as compared to vessels subjected to a deep draw thermoforming process.

Figure 5:
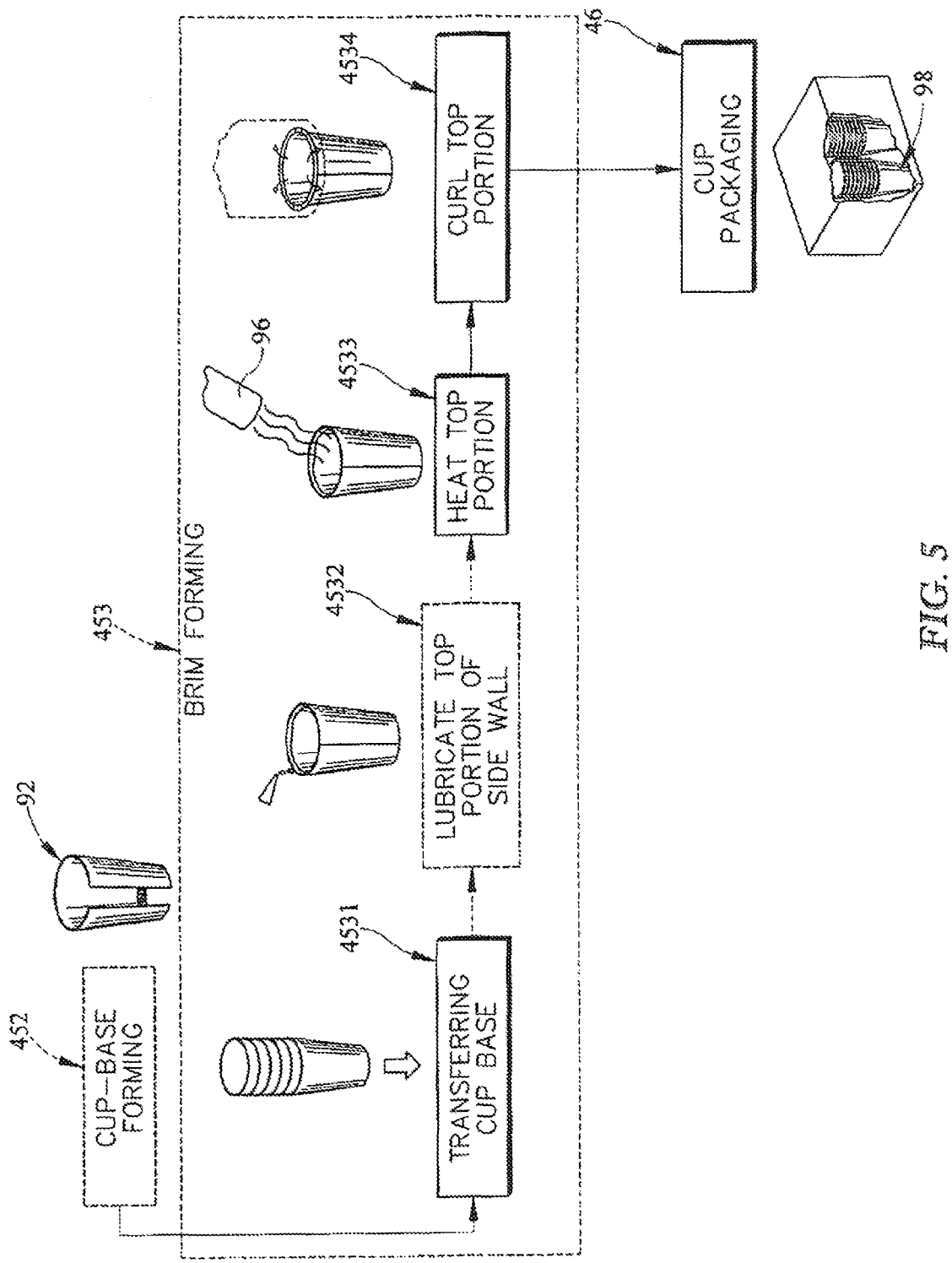
FIG. 5 is a perspective and diagrammatic view of the brim-forming step showing that the brim-forming step includes the steps of transferring the cup base to a brim-forming machine, optionally lubricating the top portion of the base, heating the top portion of the base, and curling the top portion of the base to form an insulative cup having a rolled brim.

Brim-forming step 453 includes a transferring cup-base step 4531, an optional lubricating top-portion step 4532, heating top-portion step 4533, and rolling top-portion step 4534 as shown in FIG. 5. Transferring cup-base step 4531 transfers base 12 from a cup-base forming machine to a brim-forming machine. Lubricating top-portion step 4532 lubricates top portion 22 of base 12. Heating top-portion step 4533 applies heat 96 to top portion 22 of base 12. Curling top-portion step 4534 curls top portion 22 away from interior region 14 to establish rolled brim 16 and form insulative cup 10.

Figure 6:
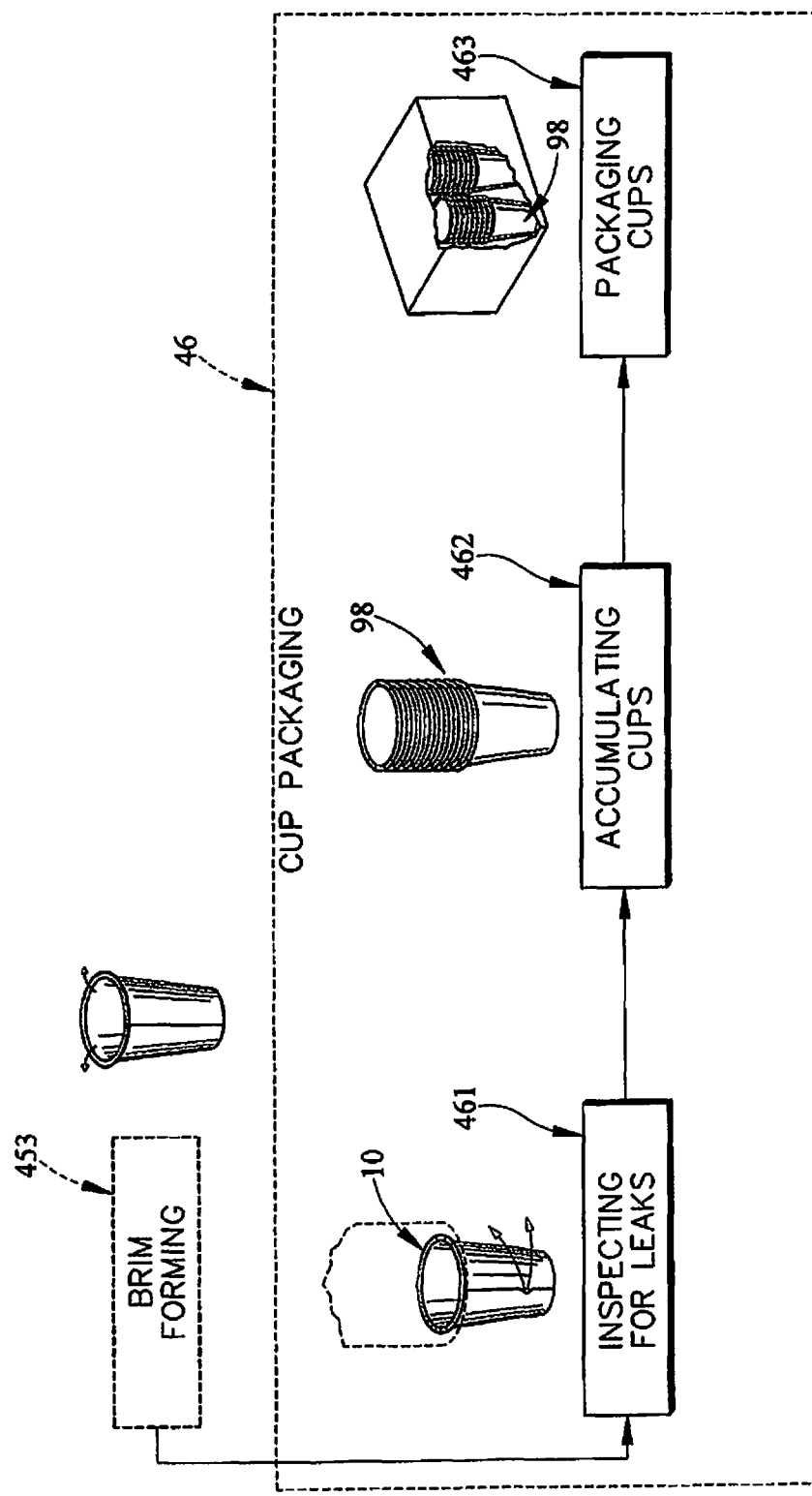
FIG. 6 is a perspective and diagrammatic view of the cup-packaging step showing that the cup-packaging step includes the steps of inspecting the insulative cup for leaks, accumulating the good cups to form stacks of insulative cups, and packaging the stacks of insulative cups for storage and transportation.

Cup-packaging stage 46 includes a leak inspecting step 461, an accumulating cups step 462, and a packaging cups step 463 as shown in FIG. 6. Leak inspecting step 461 inspects each insulative cup 10 formed during brim-forming step 453 for leaks. Those cups failing the leak inspection are collected and recycled owing to formation of those cups from insulative cellular non-aromatic polymeric material. Those cups passing the leak inspection are accumulated in accumulating cups step 462 to form a stack 98 of insulative cups. Packaging cups step 463 stores stack 98 of insulative cups for storage, use, or transportation as shown in FIG. 6.

Another embodiment of a strip-forming stage 300 is shown for example in FIG. 8. Strip-forming stage 300 incorporates a blender 302 for material blending of the resin. Resin is fed into a primary extruder 304. In this example, a first physical blowing agent A 306 and a second physical blowing agent B 308 are introduced to expand the resin to reduce density. As an example, first physical blowing agent A 306 may be $CO_2$, $N_2$, or any other suitable alternative. Second physical blowing agent B 308 may be, for example, R134a as an example. The material exits the primary extruder 304 and is introduced into the secondary extruder 310. The two extruders 304 and 310 act as tandem extruders to promote material dispersion and homogeneity.

An annular die 312 is used to form a tube of material. A cooling can nose 314 uses air to promote formation of bubbles. The surface temperature of the cooling can nose is regulated. In one exemplary embodiment, opposing knives 316 are positioned preferably opposite each other (for example, at 3 and 9 o'clock) to slit the extrudate into two strips. Alternatively, a single knife can be used. Alternatively, the extrudate need not be slit at all. The extrudate thus formed can be inspected, for example by a laser thickness sensor 318 to ensure proper and uniform thickness.

A gas, such as, but not limited to, carbon dioxide, nitrogen, other relatively inert gas, a mixture of gases or the like, is introduced into the molten resin mixture to expand the polypropylene and reduce density by forming cells in the molten polypropylene. R134a or other haloalkane refrigerant may be used with the gas. In one aspect of the present disclosure, the cells formed in the insulative cellular non-aromatic polymeric material may have an average size in a range of about 0.010 to about 0.030 inches. Because of the small cell size, in part, the sheet thus formed has a smooth surface and can accept direct printing of high resolution graphics.

Other adjustments may be made to ensure a sufficiently small cell size and, thereby, facilitate a smoother surface to accept direct printing of high resolution graphics. In illustrative embodiments, relatively greater amounts of carbon dioxide, nitrogen, other relatively inert gas, a mixture of gases or the like, may be introduced into the molten resin mixture to expand the polypropylene and further reduce its density by forming smaller cells in the molten polypropylene. Moreover, relatively greater amounts of copolymer may be added to the resin mix. Furthermore, adjustments may be made to the temperature of the cooling can during the extrusion stage. Still further, the tandem extruder arrangement shown in FIG. 8 may be replaced with a co-extrusion foaming die, which can facilitate putting a cap on one side of the strip.

As discussed herein, cup-manufacturing process 140 is used to form printed strip 170 for use in forming insulative cup 10. Printed strip 170 includes ink 656 printed on strip 82 of insulative cellular non-aromatic polymeric material as shown in FIG. 9.

Another embodiment of printed strip 270 in accordance with the present disclosure is shown in FIG. 10. Printed strip 270 includes outer ink 656o, strip 82 of insulative cellular non-aromatic polymeric material, and inner ink 656i as shown in FIG. 10. As a result, ink 656o, 656i is arranged on both sides of strip 82 of insulative cellular non-aromatic polymeric material. In other embodiments, ink layer(s) 656 may be omitted on one or both sides.

An insulative cup 10 is formed using strip 82 of insulative cellular non-aromatic polymeric material in cup-manufacturing process 140 as shown in FIGS. 1-6. Insulative cup 10 includes, for example, a body 11 having a sleeve-shaped side wall 18 and a floor 20 coupled to body 11 to cooperate with the side wall 18 to form an interior region 14 for storing food, liquid, or any suitable product as shown in FIG. 11. Body 11 also includes a rolled brim 16 coupled to an upper end of side wall 18 and a floor mount 17 coupled to a lower end of side wall 18 and to the floor 20 as illustrated in FIGS. 11 and 13.

Body 11 is formed from a strip 82 of insulative cellular non-aromatic polymeric material as disclosed herein. In accordance with the present disclosure, strip 82 of insulative cellular non-aromatic polymeric material is configured through application of pressure and heat (though in exemplary embodiments configuration may be without application of heat) to provide means for enabling localized plastic deformation in at least one selected region of body 11 to provide a plastically deformed first strip segment having a first density located in a first portion of the selected region of body 11 and a second strip segment having a second density lower than the first density located in an adjacent second portion of the selected region of body 11 without fracturing the strip of insulative cellular non-aromatic polymeric material so that a predetermined insulative characteristic is maintained in body 11.

A first 101 of the selected regions of body 11 in which localized plastic deformation is enabled by the insulative cellular non-aromatic polymeric material is in sleeve-shaped side wall 18 as suggested in FIGS. 11 and 15. Sleeve-shaped side wall 18 includes an upright inner tab 514, an upright outer tab 512, and an upright fence 513 as suggested in FIGS. 11 and 14-17. Upright inner tab 514 is arranged to extend upwardly from floor 20 and configured to provide the first strip segment having the first density in the first 101 of the selected regions of body 11. Upright outer tab 512 is arranged to extend upwardly from floor 20 and to mate with upright inner tab 514 along an interface I therebetween as suggested in FIG. 16. Upright fence 513 is arranged to interconnect upright inner and outer tabs 514, 512 and surround interior region 14. Upright fence 513 is configured to provide the second strip segment having the second density in the first 101 of the selected regions of body 11 and cooperate with upright inner and outer tabs 514, 513 to form sleeve-shaped side wall 18 as suggested in FIGS. 14-17.

A second 102 of the selected regions of body 11 in which localized plastic deformation is enabled by the sheet of insulative cellular non-aromatic polymeric material is in rolled brim 16 included in body 11 as suggested in FIGS. 11 and 16. Rolled brim 16 is coupled to an upper end of sleeve-shaped side wall 18 to lie in spaced-apart relation to floor 20 and to frame an opening into interior region 14. Rolled brim 16 includes an inner rolled tab 164, an outer rolled tab 162, and a rolled lip 163 as suggested in FIGS. 11, 14, and 16. Inner rolled tab 164 is configured to provide the first strip segment in the second 102 of the selected regions of body 11. Inner rolled tab 164 coupled to an upper end of upright outer tab 512 included in sleeve-shaped side wall 18. Outer rolled tab 162 is coupled to an upper end of upright inner tab 514 included in sleeve-shaped side wall 18 and to an outwardly facing exterior surface of inner rolled tab 164. Rolled lip 163 is arranged to interconnect oppositely facing side edges of each of inner and outer rolled tabs 164, 162. Rolled lip 163 is configured to provide the second strip segment having the second density in the second 102 of the selected region of body 11 and cooperate with inner and outer rolled tabs 164, 162 to form rolled brim 16 as suggested in FIG. 2.

A third 103 of the selected regions of body 11 in which localized plastic deformation is enabled by the sheet of insulative cellular non-aromatic polymeric material is in a floor mount included in body 11 as suggested in FIGS. 11 and 17. Floor mount 17 is coupled to a lower end of sleeve-shaped side wall 18 to lie in spaced-apart relation to rolled brim 16 and to floor 20 to support floor 20 in a stationary position relative to sleeve-shaped side wall 18 to form interior region 14. Floor mount 17 includes a web-support ring 126, a floor-retaining flange 26, and a web 25. Web-support ring 126 is coupled to the lower end of sleeve-shaped side wall 18 and configured to provide the second strip segment having the second density in the third 103 of the selected regions of body 11. Floor-retaining flange 26 is coupled to floor 20 and arranged to be surrounded by web-support ring 126. Web 25 is arranged to interconnect floor-retaining flange 26 and web-support ring 126. Web 25 is configured to provide the first strip segment having the first density in the third 103 of the selected regions of body 11.

A fourth 104 of the selected regions of body 11 in which localized plastic deformation is enabled by the strip of insulative cellular non-aromatic polymeric material is in floor-retaining flange of floor mount 17 as suggested in FIGS. 11, 13, and 18. Floor-retaining flange 26 includes an alternating series of upright thick and thin staves arranged in side-to-side relation to extend upwardly from web 25 toward interior region 14 bounded by sleeve-shaped side wall 18 and floor 20. A first 261 of the upright thick staves is configured to include a right side edge extending upwardly from web 25 toward interior region 14. A second 262 of the upright thick staves is configured to include a left side edge arranged to extend upwardly from web 25 toward interior region 14 and lie in spaced-apart confronting relation to right side edge of the first 261 of the upright thick staves. A first 260 of the upright thin staves is arranged to interconnect left side edge of the first 261 of the upright thick staves and right side edge of the second 262 of the upright thick staves and to cooperate with left and right side edges to define therebetween a vertical channel 263 opening inwardly into a lower interior region bounded by floor-retaining flange 26 and a horizontal platform 21 included in floor 20 and located above floor-retaining flange 26. The first 260 of the upright thin staves is configured to provide the first strip segment in the fourth 104 of the selected regions of body 11. The first 261 of the upright thick staves is configured to provide the second strip segment in the fourth 104 of the selected regions of the body 11.

The compressibility of the insulative cellular non-aromatic polymeric material used to produce insulative cup 10 allows the insulative cellular non-aromatic polymeric material to be prepared for the mechanical assembly of insulative cup 10, without limitations experienced by other non-aromatic polymeric materials. The cellular nature of the material provides insulative characteristics as discussed below, while susceptibility to plastic deformation permits yielding of the material without fracture. The plastic deformation experienced when the insulative cellular non-aromatic polymeric material is subjected to a pressure load is used to form a permanent set in the insulative cellular non-aromatic polymeric material after the pressure load has been removed. In some locations, the locations of permanent set are positioned to provide controlled gathering of the strip of insulative cellular non-aromatic polymeric material.

The plastic deformation may also be used to create fold lines in the strip to control deformation of the strip when being worked during the assembly process. When deformation is present, the absence of material in the voids formed by the deformation provides relief to allow the material to be easily folded at the locations of deformation.

A potential feature of a cup or other article formed of material according to one aspect of the present disclosure is that the outside (or inside or both) wall surface of the strip of insulative cellular non-aromatic polymeric material (prior to being formed into a cup, or during cup formation, depending on the manufacturing process employed) can accept printing of high-resolution graphics. Conventional beaded expanded polystyrene cups have a surface which typically is not smooth enough to accept printing other than low-resolution graphics. Similarly, known uncoated paper cups also typically do not have a smooth enough surface for such high-resolution graphics. Paper cups can be coated to have the desired surface finish and can achieve high resolution. Paper has difficulty reaching insulation levels and requires a designed air gap incorporated into or associated with the cup to achieve insulation, such as a sleeve slid onto and over a portion of the cup. Accordingly, solutions have been to use low-resolution printing, laminate to the outside wall a film which has been printed, or to have a printed sleeve (either bonded or removable) inserted over the outside wall or coat the paper to accept high resolution graphics.

Insulative cup 10 of the present disclosure satisfies a long-felt need for a vessel that includes many if not all the features of insulative performance, ready for recyclability, high-quality graphics, chemical resistance, puncture resistance, frangibility resistance, stain resistance, microwavability, and resistance to leaching undesirable substances into products stored in the interior region of the drink cup as discussed above. Others have failed to provide a vessel that achieves combinations of these features as reflected in the appended claims. This failure is a result of the many features being associated with competitive design choices. As an example, others have created vessels that based on design choices are insulated but suffer from poor puncture resistance, lack of microwavability, and leech undesirable substances into products stored in the interior region. In comparison, insulative cup 10 overcomes the failures of others by using an insulative cellular non-aromatic polymeric material.

As an example, the insulative cellular non-aromatic polymeric material comprises a polypropylene base resin having a high melt strength, a polypropylene copolymer or homopolymer (or both), and cell-forming agents including at least one nucleating agent and a blowing agent such as carbon dioxide. As a further example, the insulative cellular non-aromatic polymeric material further comprises a slip agent. The polypropylene base resin has a broadly distributed unimodal (not bimodal) molecular weight distribution.

One aspect of the present disclosure provides a formulation for manufacturing an insulative cellular non-aromatic polymeric material. As referred to herein, an insulative cellular non-aromatic polymeric material refers to an extruded structure having cells formed therein and has desirable insulative properties at given thicknesses. Another aspect of the present disclosure provides a resin material for manufacturing an extruded structure of insulative cellular non-aromatic polymeric material. Still another aspect of the present disclosure provides an extrudate comprising an insulative cellular non-aromatic polymeric material. Yet another aspect of the present disclosure provides a structure of material formed from an insulative cellular non-aromatic polymeric material. A further aspect of the present disclosure provides a container formed from an insulative cellular non-aromatic polymeric material.

In exemplary embodiments, a formulation includes at least one polymeric material. In one exemplary embodiment a primary or base polymer comprises a high melt strength polypropylene that has long chain branching. Long chain branching occurs by the replacement of a substituent, e.g., a hydrogen atom, on a monomer subunit, by another covalently bonded chain of that polymer, or, in the case of a graft copolymer, by a chain of another type. For example, chain transfer reactions during polymerization could cause branching of the polymer. Long chain branching is branching with side polymer chain lengths longer than the average critical entanglement distance of a linear polymer chain. Long chain branching is generally understood to include polymer chains with at least 20 carbon atoms depending on specific monomer structure used for polymerization. Another example of branching is by cross-linking of the polymer after polymerization is complete. Some long chain branch polymers are formed without cross-linking. Polymer chain branching can have a significant impact on material properties. Final selection of a polypropylene material may take into account the properties of the end material, the additional materials needed during formulation, as well as the conditions during the extrusion process. In exemplary embodiments high melt strength polypropylenes may be materials that can hold a gas (as discussed hereinbelow), produce desirable cell size, have desirable surface smoothness, and have an acceptable odor level (if any).

One illustrative example of a suitable polypropylene base resin is DAPLOY™ WB140 homopolymer (available from Borealis A/S), a high melt strength structural isomeric modified polypropylene homopolymer (melt strength=36, as tested per ISO 16790 which is incorporated by reference herein, melting temperature=325.4° F. (163° C.) using ISO 11357, which is incorporated by reference herein).

Borealis DAPLOY™ WB140 properties (as described in a Borealis product brochure):

| Property | Typical Value | Unit | Test Method |
|---|---|---|---|
| Melt Flow Rate (230/2.16) | 2.1 | g/10 min | ISO 1133 |
| Flexural Modulus | 1900 | MPa | ISO 178 |
| Tensile Strength at Yield | 40 | MPa | ISO 527-2 |
| Elongation at Yield | 6 | % | ISO 527-2 |
| Tensile Modulus | 2000 | MPa | ISO 527-2 |
| Charpy impact strength, notched (+23° C.) | 3.0 | kJ/m$^2$ | ISO 179/1eA |
| Charpy impact strength, notched (−20° C.) | 1.0 | kJ/m$^2$ | ISO 179/1eA |
| Heat Deflection Temperature A (at 1.8 MPa load) | 60 | ° C. | ISO 75-2 Method A |
| Heat Deflection Temperature B (at 0.46 MPa load) | 110 | ° C. | ISO 75-2 Method B |

Other polypropylene polymers having suitable melt strength, branching, and melting temperature may also be used. Several base resins may be used and mixed together.

In certain exemplary embodiments, a secondary polymer may be used with the base polymer. The secondary polymer may be, for example, a polymer with sufficient crystallinity. In exemplary embodiments the secondary polymer may be at least one crystalline polypropylene homopolymer, an impact copolymer, mixtures thereof or the like. One illustrative example is a high crystalline polypropylene homopolymer, available as F020HC from Braskem. Another illustrative example is a polymer commercially available as PRO-FAX SC204™ (available from LyndellBasell Industries Holdings, B.V.). Another illustrative example include is Homo PP-INSPIRE 222, available from Braskem. In one aspect the polypropylene may have a high degree of crystallinity, i.e., the content of the crystalline phase exceeds 51% (as tested using differential scanning calorimetry) at 10° C./min cooling rate. In exemplary embodiments several different secondary polymers may be used and mixed together.

In exemplary embodiments, the secondary polymer may be or may include polyethylene. In exemplary embodiments, the secondary polymer may include low density polyethylene, linear low density polyethylene, high density polyethylene, ethylene-vinyl acetate copolymers, ethylene-ethyl-acrylate copolymers, ethylene-acrylic acid copolymers, mixtures of at least two of the foregoing and the like. The use of non-polypropylene materials may affect recyclability, insulation, microwavability, impact resistance, or other properties, as discussed further hereinbelow.

One or more nucleating agents are used to provide and control nucleation sites to promote formation of cells, bubbles, or voids in the molten resin during the extrusion process. Nucleating agent means a chemical or physical material that provides sites for cells to form in a molten resin mixture. Nucleating agents may be physical agents or chemical agents. Suitable physical nucleating agents have desirable particle size, aspect ratio, and top-cut properties. Examples include, but are not limited to, talc, $CaCO_3$, silica (e.g., Aerosil® 200, manufactured by Evonik Industries AG of Hanau-Wolfgang, Germany), mica, and mixtures of at least two of the foregoing. The nucleating agent may be blended with the polymer resin formulation that is introduced into the hopper. Alternatively, the nucleating agent may be added to the molten resin mixture in the extruder. When the chemical reaction temperature is reached the nucleating agent acts to enable formation of bubbles that create cells in the molten resin. An illustrative example of a chemical blowing agent is citric acid or a citric acid-based material. After decomposition, the chemical blowing agent forms small gas cells which further serve as nucleation sites for larger cell growth from a physical or other types of blowing agents. One representative example is Hydrocerol™ CF-40E™ (available from Clariant Corporation), which contains citric acid and a crystal nucleating agent. In illustrative embodiments one or more catalysts or other reactants may be added to accelerate or facilitate the formation of cells.

In certain exemplary embodiments, one or more blowing agents may be incorporated. Blowing agent means a physical or a chemical material (or combination of materials) that acts to expand nucleation sites. Nucleating agents and blowing agents may work together. The blowing agent acts to reduce density by forming cells in the molten resin. The blowing agent may be added to the molten resin mixture in the extruder. Representative examples of physical blowing agents include, but are not limited to, carbon dioxide, nitrogen, helium, argon, air, pentane, butane, or other alkane mixtures of the foregoing and the like. In certain exemplary embodiments, a processing aid may be employed that enhances the solubility of the physical blowing agent. Alternatively, the physical blowing agent may be a hydrofluorocarbon, such as 1,1,1,2-tetrafluoroethane, also known as R134a, or other haloalkane refrigerant. Selection of the blowing agent may be made to take environmental impact into consideration.

In exemplary embodiments, physical blowing agents are typically gases that are introduced as liquids under pressure into the molten resin via a port in the extruder as suggested in FIG. 7. As the molten resin passes through the extruder and the die head, the pressure drops causing the physical blowing agent to change phase from a liquid to a gas, thereby creating cells in the extruded resin. Excess gas blows off after extrusion with the remaining gas being trapped in the cells in the extrudate.

Chemical blowing agents are materials that degrade or react to produce a gas. Chemical blowing agents may be endothermic or exothermic. Chemical blowing agents typically degrade at a certain temperature to decompose and release gas. In one aspect the chemical blowing agent may be one or more materials selected from the group consisting of azodicarbonamide; azodiisobutyro-nitrile; benzenesulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis (benzene sulfonyl hydrazide); diphenyl sulfone-3,3'-disulfonyl hydrazide; calcium azide; 4,4'-diphenyl disulfonyl azide; and p-toluene sulfonyl azide.

In one aspect of the present disclosure, where a chemical blowing agent is used, the chemical blowing agent may be introduced into the resin formulation that is added to the hopper.

In one aspect of the present disclosure, the blowing agent may be a decomposable material that forms a gas upon decomposition. A representative example of such a material is citric acid or a citric-acid based material. In one exemplary aspect of the present disclosure it may be possible to use a mixture of physical and chemical blowing agents.

In one aspect of the present disclosure, at least one slip agent may be incorporated into the resin mixture to aid in increasing production rates. Slip agent (also known as a process aid) is a term used to describe a general class of materials which are added to a resin mixture and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation.

One or more additional components and additives optionally may be incorporated, such as, but not limited to, impact modifiers, colorants (such as, but not limited to, titanium dioxide), and compound regrind.

The polymer resins may be blended with any additional desired components and melted to form a resin formulation mixture.

In an alternative exemplary embodiment, instead of polypropylene as the primary polymer, a polylactic acid material may be used, such as, but not limited to, a polyactic acid material derived from a food-based material, for example, corn starch. In one exemplary embodiment, polyethylene may be used as the primary polymer.

In one exemplary aspect of the present disclosure, one formulation for a material useful in the formation of an insulative cellular non-aromatic polymeric material includes the following: at least one primary resin comprising a high melt strength long chain branched polypropylene, at least one secondary resin comprising a high crystalline polypropylene homopolymer or an impact copolymer, at least one nucleating agent, at least one blowing agent, and at least one slip agent. Optionally, a colorant may be incorporated.

The formulation may be introduced into an extruder via a hopper, such as that shown in FIG. 7. During the extrusion process the formulation is heated and melted to form a molten resin mixture. In exemplary embodiments, at least one physical blowing agent is introduced into the molten resin mixture via one or more ports in the extruder. The molten resin mixture and gas is then extruded through a die.

In another exemplary embodiment, the formulation may contain both at least one chemical blowing agent and at least one physical blowing agent.

Cups or other containers or structures may be formed from the sheet according to conventional apparatus and methods.

For the purposes of non-limiting illustration only, formation of a cup from an exemplary embodiment of a material disclosed herein will be described; however, the container may be in any of a variety of possible shapes or structures or for a variety of applications, such as, but not limited to, a conventional beverage cup, storage container, bottle, or the like. For the purpose of nonlimiting illustration only, a liquid beverage will be used as the material which can be contained by the container; however, the container may hold liquids, solids, gels, combinations thereof, or other material.

A potential unexpected feature of the sheet of insulative cellular non-aromatic polymeric material formed as described herein is the high insulation value obtained at a given thickness. See, for example, Examples 1 and 2 disclosed in Ser. No. 13/491,327, filed Jun. 7, 2012 and entitled POLYMERIC MATERIAL FOR AN INSULATED CONTAINER, which application is hereby incorporated in its entirety herein.

A potential feature of a cup formed of insulative cellular non-aromatic polymeric material according to exemplary embodiments of the present disclosure is that the cup has low material loss. Furthermore, the material of the present disclosure may have markedly low off-gassing when subjected to heat from a conventional kitchen-type microwave oven for periods of time up to several minutes.

Another potential feature of a cup formed of the insulative cellular non-aromatic polymeric material according to the present disclosure is that the cup can be placed in and go through a conventional residential or commercial dishwasher cleaning cycle (top rack) without noticeable structural or material breakdown or adverse affect on material properties. This is in comparison to beaded expanded polystyrene cups or containers which can break down under similar cleaning processes. Accordingly, a cup made according to one aspect of the present disclosure can be cleaned and reused.

Another potential feature of an article formed of the insulative cellular non-aromatic polymeric material according to various aspects of the present disclosure is that the article can be recycled. Recyclable means that a material can be added (such as regrind) back into an extrusion or other formation process without segregation of components of the material, i.e., an article formed of the material does not have to be manipulated to remove one or more materials or components prior to re-entering the extrusion process. For example, a cup having a printed film layer laminated to the exterior of the cup may be recyclable if one does not need to separate out the film layer prior to the cup being ground into particles. In contrast, a paper-wrapped expanded polystyrene cup may not be recyclable because the polystyrene material could not practically be used as material in forming an expanded polystyrene cup, even though the cup material may possibly be formed into another product. As a further example, a cup formed from a non-expanded polystyrene material having a layer of non-styrene printed film adhered thereto may be considered non-recyclable because it would require the segregation of the polystyrene cup material from the non-styrene film layer, which would not be desirable to introduce as part of the regrind into the extrusion process.

Recyclability of articles formed from the insulative cellular non-aromatic polymeric material of the present disclosure minimizes the amount of disposable waste created. In comparison, beaded expanded polystyrene cups that break up into beads and thus ordinarily cannot easily be reused in a manufacturing process with the same material from which the article was formed. And, paper cups that typically have an extrusion coated plastic layer or a plastic lamination for liquid resistance ordinarily cannot be recycled because the different materials (paper, adhesive, film, plastic) normally cannot be practicably separated in commercial recycling operations.

A potential feature of a cup formed of the insulative cellular non-aromatic polymeric material according to one aspect of the present disclosure is that it possesses unexpected strength as measured by rigidity. Rigidity is a measurement done at room temperature and at an elevated temperature (e.g., by filling the cup with a hot liquid) and measuring the rigidity of the material. The strength of the cup material is important to reduce the potential for the cup being deformed by a user and the lid popping off or the lid or sidewall seal leaking.

A potential feature of a cup formed of the insulative cellular non-aromatic polymeric material according to the present disclosure is that the sleeve is resistant to puncture, such as by a straw, fork, spoon, finger nail, or the like, as measured by standard impact testing, as described hereinbelow. Test materials demonstrated substantially higher impact resistance when compared to a beaded expanded polystyrene cup. Accordingly, a cup formed one aspect as described herein can reduce the likelihood of puncture and leakage of hot liquid onto a user.

A feature of a cup with a compressed brim and seam formed of the material according to one aspect as described herein is that a greater number of such cups can be nested in a given sleeve length because the seam is thinner and the side wall angle can be minimized (i.e., more approaching 90° with respect to the cup bottom) while providing a sufficient air gap to permit easy de-nesting. Conventionally seam-formed cups having a seam substantially thicker than the side wall requires a greater side wall angle (and air gap) to allow for de-nesting, resulting in fewer cups being able to be nested in a given sleeve length.

A feature of a cup formed of the material according to one aspect of the present disclosure is that the brim may have a cross-section profile of less than about 0.170 inches (4.318 mm) which may be due to localized cell deformation and compression. Such a small profile is more aesthetically pleasing than a larger profile.

A feature of a cup formed of the material according to one aspect of the present disclosure is that the rolled brim diameter can be the same for cups of different volumes, enabling one lid size to be used for different cup sizes, assuming the cup rims outside diameters are the same. As a result, the number of different size lids in inventory and at the point of use may be reduced.

The material formulation may have properties that allow the sheet to be compressed without fracturing.

The insulative cellular non-aromatic polymeric material of the present disclosure may be formed into a strip which can be wrapped around other structures. For example, a strip of the material according to one aspect of the present disclosure that can be used as a wrapping material may be formed and wrapped around a pipe, conduit, or other structure to provide improved insulation. The sheet or strip may have a layer of adhesive, such as a pressure sensitive adhesive, applied to one or both faces. The strip may be wound onto a roll. Optionally, the strip may have a release liner associated therewith to make unwinding the strip from the roll easier. The polymer formulation may be adapted to provide the requisite flexibility to form a wrap or windable strip, for example, by using one or more polypropylene or other polyolefin materials that have sufficient flexibility to enable the extruded sheet to be flexible enough to be wound onto a roll. The insulative cellular non-aromatic polymeric material may be formed into a sleeve that can be inserted over a cup to provide additional insulation.

In exemplary embodiments sheets formed from the insulative cellular non-aromatic polymeric material of the present disclosure may be cut at the die or be flaked and used as a bulk insulator.

The formulation and insulative cellular non-aromatic polymeric material of the present disclosure satisfies a long-felt need for a material that can be formed into an article, such as a cup, that includes many if not all of the features of insulative performance, ready for recyclability, puncture resistance, frangibility resistance, microwavability and other features as discussed herein. Others have failed to provide a material that achieves combinations of these features as reflected in the appended claims. This failure is a result of the features being associated with competitive design choices. As an example, others have created materials and structures therefrom that based on design choices are insulated but suffer from poor puncture resistance, inability to effectively be recyclable, and lack microwavability. In comparison, the formulations and materials disclosed herein overcome the failures of others by using an insulative cellular non-aromatic polymeric material.

The cup may be formed from an extruded sheet of material by any of the extrusion processes suggested in FIGS. 1, 7, and 8 and described hereinabove. The sheet may be made of a polypropylene base resin, such as a high melt strength polypropylene. In one exemplary embodiment, the polypropylene base resin may be DAPLOY™ WB140 homopolymer (available from Borealis A/S), a high melt strength polypropylene. The secondary resin may be an impact copolymer polypropylene sold as PRO-FAX SC204™ (available from LyndellBasell Industries Holdings, B.V.). The two resins may be blended with Hydrocerol CF-40E as a primary nucleation agent, talc loaded at 60% as a secondary nucleation agent, and titanium dioxide as a colorant. The resins may be blended, together with any additional desired components, if needed, and melted to form a resin mixture. In an alternative exemplary embodiment, polypropylene can be substituted by a polylactic acid material, such as a food-based material, for example, corn starch.

A gas, such as, but not limited to, carbon dioxide, nitrogen, other relatively inert gas, a mixture of gases or the like, is introduced into the molten resin mixture to expand the polypropylene and reduce density by forming cells in the molten polypropylene. R134a or other haloalkane refrigerant may be used with the gas. In one aspect of the present disclosure the cells formed in the insulative cellular non-aromatic polymeric material may have an average size in a range of about 0.010-0.030 inches. Because of the small cell size, in part, the sheet thus formed has a smooth surface and can accept printing of high resolution graphics.

Other adjustments may be made to ensure a sufficiently small cell size and, thereby, facilitate a smoother surface to accept direct printing of high resolution graphics. In illustrative embodiments, relatively greater amounts of carbon dioxide, nitrogen, other relatively inert gas, a mixture of gases or the like, may be introduced into the molten resin mixture to expand the polypropylene and further reduce its density by forming smaller cells in the molten polypropylene. Moreover, relatively greater amounts of copolymer may be added to the resin mix. Furthermore, adjustments may be made to the temperature of the cooling can during the extrusion stage. Still further, the tandem extruder arrangement shown in FIG. 16 may be replaced with a co-extrusion foaming die, which can facilitate putting a cap on a side of the sheet or strip.

The material of the present disclosure may also be formed into a deformable sheet which can be wrapped around other structures. For example, a strip or sheet of the present material may be formed and wrapped around a pipe, conduit, or other structure to provide improved insulation.

A potential feature of an insulative cup formed of insulative cellular non-aromatic polymeric material according to exemplary embodiments of the present disclosure is that the cup has low material loss. Furthermore, the material of the present disclosure may have markedly low off-gassing when subjected to heat from a conventional kitchen-type microwave oven for periods of time up to several minutes.

Another potential feature of an insulative cup formed of insulative cellular non-aromatic polymeric material according to the present disclosure is that the cup can be placed in and go through a conventional residential or commercial dishwasher cleaning cycle (top rack) without noticeable structural or material breakdown or adverse affect on material properties. This is in comparison to beaded expanded polystyrene cups or containers which can break down under similar cleaning processes. Accordingly, a cup made according to one aspect of the present disclosure can be cleaned and reused.

Another potential feature of an insulative cup formed of insulative cellular non-aromatic polymeric material according to various aspects of the present disclosure is that the insulative cup and scrap material can be recycled. Recyclable means that a material can be added (such as regrind) back into an extrusion or other formation process without segregation of components of the material. As an example, an insulative cup formed the insulative cellular non-aromatic polymeric material does not have to be manipulated to remove one or more materials or components prior to re-entering the extrusion process.

In another example, an insulative cup formed from a printed strip may be recyclable as only insulative cellular non-aromatic polymeric material and ink are included in the printed strip. In contrast, a paper-wrapped expanded polystyrene cup may not be recyclable because the polystyrene material could not practicably be used as material in forming an expanded polystyrene cup, even though the cup material may possibly formed into another product.

As a further example, an insulative cup formed from a non-expanded polystyrene material having a layer of printed film adhered thereto may be considered non-recyclable because it would require the segregation of the film layer, which would not be desirable to introduce as part of the regrind into the extrusion process. Recyclability of articles formed using the insulative cellular non-aromatic polymeric material of the present disclosure minimizes the amount of disposable waste created. In comparison, beaded expanded polystyrene cups that break up into beads and thus ordinarily cannot be reused easily in a manufacturing process with the same material from which the article was formed. In addition, paper cups that typically have an extrusion coated plastic layer or a plastic lamination for liquid resistance ordinarily cannot be recycled because the different materials (paper, adhesive, film, plastic) normally cannot be practicably separated in commercial recycling operations.

A potential feature of an insulative cup formed of insulative cellular non-aromatic polymeric material according to one aspect of the present disclosure is that it possesses unexpected strength as measured by rigidity. Rigidity is a measurement done at room temperature and at an elevated temperature (e.g., by filling the cup with a hot liquid) and measuring the rigidity of the material. The strength of the cup material is important to minimize deformation of the cup as the cup is being handled by a user.

A potential feature of an insulative cup formed of insulative cellular non-aromatic polymeric material according to the present disclosure is that insulative cup is resistant to puncture, such as by a straw, fork, spoon, finger nail, or the like, as measured by standard impact testing, as described hereinbelow. Test materials demonstrated substantially higher impact resistance when compared to a beaded expanded polystyrene cup. As a result, an insulative cup in accordance with the present disclosure may minimize the likelihood of puncture and leakage of hot liquid.

EXAMPLES

The following examples are set forth for purposes of illustration only. Parts and percentages appearing in such examples are by weight unless otherwise stipulated. All ASTM, ISO, and other standard test method citations referenced and other testing methodologies referred to in this disclosure are incorporated by reference in their entirety.

Example 1—Formulation and Extrusion

DAPLOY™ WB140 polypropylene homopolymer (available from Borealis A/S) was used as the polypropylene base resin. F020HC, available from Braskem, a polypropylene homopolymer resin, was used as the secondary resin. The two resins were blended with: Hydrocerol™ CF-40E™ as a primary nucleation agent, talc as a secondary nucleation agent, $CO_2$ as a blowing agent, a slip agent, and titanium dioxide as a colorant. Percentages were:

- 79.9% Primary resin: high melt strength polypropylene Borealis WB140 HMS15%
- Secondary resin: F020HC (Braskem)
- 0.1% Primary nucleating agent: Clariant Hyrocerol CF-40E™2% Secondary nucleating agent: Talc
- 1% Colorant: $TiO_2$ PE (alternatively, PP can be used)
- 2% Slip agent: Ampacet™ 102823 LLDPE (linear low-density polyethylene), available from Ampacet Corporation The formulation was added to an extruder hopper. The extruder heated the formulation to form a molten resin mixture. To this mixture was added:

1.1 lbs/hr $CO_2$ 0.7 lbs/hr R134a

The carbon dioxide with R134a was injected into the resin blend to expand the resin and reduce density. The mixture thus formed was extruded through a die head into a sheet. The sheet was then cut and formed into a cup.

Example 1—Test Results

The test results of the material formed according to Example 1 showed the material had a density of 0.1902 $g/cm^3$ and a nominal sheet gauge of 0.089 inches.

Microwavability

Containers produced using this material filled with 12 ounces of room temperature water were heated in a FISO Microwave Station (1200 Watts) microwave oven for 2.5 min without burning or scorching or other visible effect on the cup. In comparison, paper cups heated in the same microwave oven scorched or burned in less than 90 seconds.

Rigidity

Test Method

Samples were at 73° F. and 50% relative humidity. The Cup Stiffness/Rigidity test was conducted with a horizontal force gauge containing a load cell to measure the resisting force of the cup when exposed to the following test conditions: (a) The test location on the cup was ⅓ down from the rim of the cup. (b) Testing travel distance is ¼ inches. (c) Testing travel time was 10 seconds.

Test Results

With an average wall thickness of 0.064 inches, average density of 0.1776 $g/cm^3$, and average cup weight of 9.86 g, the rigidity of the material are shown below in Tables 1-2.

TABLE 1

Rigidity Test Results

| Cup # | Rigidities (kg-F) | | |
|---|---|---|---|
| | Seam | 90° from Seam | Average |
| unlidded/unfilled | | | |
| 1 | 0.64 | 0.654 | 0.647 |
| 2 | 0.646 | 0.672 | 0.659 |
| 3 | 0.632 | 0.642 | 0.637 |
| 4 | 0.562 | 0.608 | 0.585 |
| 5 | 0.652 | 0.596 | 0.624 |
| | | | 0.630 |
| | STD DEV | 0.028 | |
| | 3sigma | 0.085 | |
| | High Range | 0.716 | |
| | Low Range | 0.545 | |
| lidded/unfilled | | | |
| 6 | 0.89 | 0.83 | 0.860 |
| 7 | 0.954 | 0.904 | 0.929 |
| 8 | 0.846 | 0.808 | 0.827 |
| 9 | 0.732 | 0.826 | 0.779 |
| 10 | 0.87 | 0.792 | 0.831 |
| | | | 0.845 |
| | STD DEV | 0.055 | |
| | 3sigma | 0.165 | |
| | High Range | 1.011 | |
| | Low Range | 0.680 | |

TABLE 1-continued

Rigidity Test Results

| Cup # | Rigidities (kg-F) | | |
|---|---|---|---|
| | Seam | 90° from Seam | Average |
| unlidded/filled 200° F. | | | |
| 11 | 0.274 | 0.290 | 0.282 |
| 12 | 0.278 | 0.326 | 0.302 |
| 13 | 0.264 | 0.274 | 0.269 |
| 14 | 0.300 | 0.270 | 0.285 |
| 15 | 0.252 | 0.280 | 0.266 |
| | | | 0.281 |
| | STD DEV | 0.014 | |
| | 3sigma | 0.043 | |
| | High Range | 0.324 | |
| | Low Range | 0.238 | |
| lidded/filled 200° F. | | | |
| 16 | 0.346 | 0.354 | 0.350 |
| 17 | 0.386 | 0.422 | 0.404 |
| 18 | 0.358 | 0.364 | 0.361 |
| 19 | 0.338 | 0.374 | 0.356 |
| 20 | 0.304 | 0.272 | 0.288 |
| | | | 0.352 |
| | STD DEV | 0.042 | |
| | 3sigma | 0.125 | |
| | High Range | 0.476 | |
| | Low Range | 0.227 | |
| unlidded/filled ice water | | | |
| 21 | 0.796 | 0.730 | 0.763 |
| 22 | 0.818 | 0.826 | 0.822 |
| 23 | 0.894 | 0.760 | 0.827 |
| 24 | 0.776 | 0.844 | 0.810 |
| 25 | 0.804 | 0.714 | 0.759 |
| | | | 0.796 |
| | STD DEV | 0.033 | |
| | 3sigma | 0.098 | |
| | High Range | 0.894 | |
| | Low Range | 0.698 | |
| lidded/filled ice water | | | |
| 26 | 1.044 | 0.892 | 0.968 |
| 27 | 1.146 | 1.018 | 1.082 |
| 28 | 0.988 | 1.054 | 1.021 |
| 29 | 1.012 | 1.106 | 1.059 |
| 30 | 0.826 | 1.058 | 0.942 |
| | | | 1.014 |
| | STD DEV | 0.059 | |
| | 3sigma | 0.177 | |
| | High Range | 1.192 | |
| | Low Range | 0.837 | |

TABLE 2

| | Unfilled Kg-F (kilograms-force) | | Hot Fill 200° F. Kg-F | | Ice Water Fill 35° F. Kg-F | | Wall Thickness | Density |
|---|---|---|---|---|---|---|---|---|
| | Unlidded | Lidded | Unlidded | Lidded | Unlidded | Lidded | Inches | g/cc |
| Test material | 0.630 | 0.845 | 0.281 | 0.352 | 0.796 | 1.014 | 0.064 | 0.1776 |

Insulation

Test Method

A typical industrial cup insulation test method as follows was used:

Attach the (cup exterior) surface temperature thermocouple to cup with glue.

Tape attached thermocouple to cup with cellophane tape so that the thermocouple is in the middle of the cup opposite the seam.

Heat water or other aqueous liquid to near boiling, such as in a microwave.

Continually stir the hot liquid with a bulb thermometer while observing the liquid temperature.

Record thermocouple temperature.

When the liquid gets to 200° F. pour into cup to near full. Place lid on cup.

Record surface temperature for a minimum of 5 minutes.

A cup formed from the formulation noted above was used having a density of 0.1902 g/cm³ and a wall thickness of 0.089 inches (2.2606 mm). A hot liquid at 200° F. (93.3° C.) was placed in the cup.

Test Results

The temperature measured on the outside wall of the cup was about 140.5° F. (60.3° C.), i.e., a 59.5° F. (33° C.) drop. The maximum temperature over a five-minute period was observed to peak at 140.5° F. (60.3° C.).

The lower the temperature, the better the insulation property of the cup material as the material reduces the heat transferring from the liquid to the cup material exterior.

Frangibility

Frangibility can be defined as resistance to tear or punctures causing fragmentation.

Test Method

The Elmendorf test method described in ASTM D1922-93 was used. The radius of tear was 1.7 inches.

Test Results

The test results are shown in Tables 3-4 below. The material as formed in one exemplary embodiment of the present disclosure provides superior resistance to tear forces when compared to expanded polystyrene.

TABLE 4

Summary of Test Results

| | | Sample ID | |
|---|---|---|---|
| | | Test material cup | Expanded polystyrene |
| Elmendorf Tear machine direction (MD) Arm | g (gram) | 800 | 800 |
| Elmendorf Tear MD | gf (gram force) | 282 | 112 |
| Elmendorf Tear transverse direction (TD) Arm | g | 800 | n/a |
| Elmendorf Tear TD | gf | 212 | n/a |

Note that there was no data obtained for the transverse direction test for expanded polystyrene because expanded polystyrene does not have a material orientation, i.e., a machine or transverse direction, as such. The range (calculated as: lower range=mean−(3×std dev); upper range=mean+(3×std dev)) for the tested material of the present disclosure was 213-351 g-f in the machine direction and 143-281 g-f in the transverse direction. In comparison, the range of the expanded polystyrene material tested was 103-121 g-f.

Puncture Resistance

Test Method

Determine the force and travel needed to puncture cup sidewall and bottom. An Instron instrument is used in compression mode set to 10 inches per minute travel speed. The cup puncture test fixture on base of Instron is used. This fixture allows the cup to fit over a shape that fits inside the cup with a top surface that is perpendicular to the travel of the Instron tester. The one inch diameter hole of the fixture should be positioned up. The portion of the Instron that

TABLE 3

Test Results

| | Machine Direction (gram force) | | | | | | | Transverse Direction (gram force) | | | | | | |
|---|---|---|---|---|---|---|---|---|---|---|---|---|---|---|
| Tag | Test 1 | Test 2 | Test 3 | Test 4 | Test 5 | mean | std dev. | Test 1 | Test 2 | Test 3 | Test 4 | Test 5 | mean | std dev. |
| Test Material | 288 | 262 | 288 | 258 | 315 | 282 | 23 | 232 | 213 | 178 | 205 | 232 | 212 | 23 |
| Expaned polystyrene | 108 | 114 | 112 | 116 | 110 | 112 | 3 | * | | | | | | | moves should be fitted with a 0.300 inch (7.62 mm) diameter punch. The punch with the hole is aligned in the test fixture. The cup is placed over the fixture and the force and travel needed to puncture the cup sidewall is recorded. The sidewall puncture test is repeated in three evenly spaced locations while not puncture testing on the seam of the cup. The bottom of the cup is tested. This should be done in the same manner as the sidewall test except no fixture is used. The cup is just placed upside down on the base of the Instron while bringing the punch down on the center of the cup bottom.

Test Results

Force curves of the typical sidewall puncture and the bottom puncture are shown in Table 5 below.

TABLE 5

Puncture Test Results

| Cavity # | Max Load (lbf) | Ext. @ Max Load (in) |
|---|---|---|
| Expanded polystyrene | 3.79 | 0.300 |
| TROPHY ® | 6.61 | 0.155 |
| tested insulative cellular non-aromoatic polymeric material (No Rim) | 22.18 | 0.292 |

Slow Puncture—Straw

Test Method

The material as formed in one exemplary embodiment of the present disclosure provides superior resistance to punctures when compared to expanded polystyrene using the Slow Puncture Resistance Test Method as described in ASTM D-3763-86. The test results are shown in Tables 6-9 below.

Test Results

TABLE 6

Tested Insulative Cellular Non-Aromatic Polymeric Material

| Specimen # | Peak Load g(f) | Elongation At Break (mm) |
|---|---|---|
| 1 | 13876.49 | — |
| 2 | 13684.33 | — |
| 3 | 15121.53 | — |
| 4 | 15268.95 | 17 |
| 5 | 14970.47 | 20 |
| 6 | 13049.71 | — |

TABLE 6-continued

Tested Insulative Cellular Non-Aromatic Polymeric Material

| Specimen # | Peak Load g(f) | Elongation At Break (mm) |
|---|---|---|
| 7 | 15648.44 | 17 |
| 8 | 15352.38 | 23 |
| 9 | 18271.37 | — |
| 10 | 16859.29 | — |
| Mean | 15210.30 | 19 |
| Std. Dev. | 1532.83 | 3 |

TABLE 7

Expanded Polystyrene

| Specimen # | Peak Load g(f) | Elongation At Break (mm) |
|---|---|---|
| 1 | 2936.73 | — |
| 2 | 2870.07 | 10 |
| 3 | 2572.62 | — |
| 4 | 2632.44 | — |
| 5 | 2809.70 | — |
| 6 | 2842.93 | — |
| 7 | 2654.55 | — |
| 8 | 2872.96 | — |
| 9 | 2487.63 | — |
| 10 | 2866.53 | — |
| 11 | 2803.25 | — |
| 12 | 2775.22 | — |
| 13 | 2834.28 | — |
| 14 | 2569.97 | — |
| Mean | 2752.06 | 10 |
| Std. Dev. | 140.42 | — |

TABLE 8

Paper Wrapped Expanded Polystyrene

| Specimen # | Peak Load g(f) | Elongation At Break (mm) |
|---|---|---|
| 1 | 7930.61 | — |
| 2 | 10044.30 | — |
| 3 | 9849.01 | — |
| 4 | 8711.44 | — |
| 5 | 9596.79 | — |
| 6 | 9302.99 | — |
| 7 | 10252.27 | — |
| 8 | 7785.64 | — |
| 9 | 8437.28 | — |
| 10 | 6751.98 | — |
| 11 | 9993.19 | — |
| Mean | 8968.68 | — |
| Std. Dev. | 1134.68 | — |

TABLE 9

Summary of Slow Puncture-Straw Test Results

| | Sample ID | | |
|---|---|---|---|
| | Tested insulative cellular non-aromatic polymeric material cup (mean) grams-force (gf) | Expanded polystyrene (mean) grams-force (gf) | Paper wrapped expanded polystyrene (mean) grams-force (gf) |
| Average gf: | 15210 | 2752 | 8969 |

Example 2—Formulation and Extrusion

The following formulation was used:
81.70% Borealis WB140HMS primary polypropylene
0.25% Amco A18035 PPRO talc filled concentrate
2% Ampacet 102823 Process Aid PE MB linear low density polyethylene slip agent
0.05% Hydrocerol CF-40E chemical foaming agent
1% Colortech 11933-19 colorant
15% Braskem F020HC high crystallinity homopolymer polypropylene
3.4 lbs/hour of $CO_2$ was introduced into the molten resin. Density of the sheet formed ranged from 0.155-0.182 g/cc The formulation was added to an extruder hopper. The extruder heated the formulation to form a molten resin mixture. To this mixture was added the $CO_2$ to expand the resin and reduce density. The mixture thus formed was extruded through a die head into a strip. The strip was then cut and formed into a cup.

Example 2—Test Results

Rigidity
 Test Method
 The test method is the same as described for rigidity testing in Example 1.
 Test Results
 The rigidity test results are shown in Table 10 below.

TABLE 10

| Sample # | unlidded/filled 200° F. Rigidities (kg's) | | | lidded/filled 200° F. Rigidities (kg's) | | | Gram Weights | Wall Thickness | Density |
|---|---|---|---|---|---|---|---|---|---|
| | Seam | 90° from Seam | Average | Seam | 90° from Seam | Average | | | |
| B1 | 0.354 | 0.380 | 0.367 | 0.470 | 0.528 | 0.499 | 12.6 | 0.0744 | 0.1817 |
| B2 | 0.426 | 0.464 | 0.445 | 0.598 | 0.610 | 0.604 | 13.0 | | |
| B3 | 0.526 | 0.494 | 0.510 | 0.628 | 0.618 | 0.623 | 12.4 | | |
| B4 | 0.592 | 0.566 | 0.579 | 0.740 | 0.746 | 0.743 | 13.2 | | |
| | | | 0.475 | | | 0.617 | 12.80 | | |

Insulation
 Test Method—Wall Temperature

A cup formed from the formulation noted above was used having a density of 0.18 g/cm³ and a wall thickness of 0.074 inches (1.8796 mm). A hot liquid at 200° F. (93.3° C.) was placed in the cup.
 Test Results The temperature measured on the outside wall of the cup was about 151° F. (66.1° C.), i.e., a 49.0° F. (27.2° C.) drop. The maximum temperature over a five-minute period was observed to peak at 151° F. (66.1° C.).

Insulation testing in the form of thermal conductivity was done.

Thermal Conductivity
 Test Method

This test measures bulk thermal conductivity (W/m-K), measured at ambient temperature and at 93° C. A ThermTest TPS 2500 S Thermal Constants Analyzer instrument was used, employing the test method of ISO/DIS 22007-2.2 and using the Low Density/High Insulating option. The TPS sensor #5501 (6.403 mm radius) with Kapton® insulation was used for all measurements. A 20 second test was done, using 0.02 Watts power. Data using points 100-200 were reported.

Test Results
The test results are shown in Table 11 below.

TABLE 11

Mean Thermal Conductivity Results

| Temp. (° C.) | Mean Thermal Conductivity (W/m-K) | Standard Deviation (W/m-K) |
|---|---|---|
| 21 | 0.05792 | 0.00005 |
| 93 | 0.06680 | 0.00025 |

A method of forming a vessel in accordance with the present disclosure may include the steps of forming a blank for a side wall of the vessel, heating first and second portions of the blank, wrapping the blank such that the first and second portions overlap, and compressing the overlapped portions while they are heated to secure the first and second portions to form a side wall. The blank may include an insulative cellular non-aromatic polymeric material having a non-uniform density with areas of higher density formed in the blank to define depressions in the blank.

In some embodiments, the method of forming a vessel may include the steps of forming a floor blank for a floor of the vessel and placing the floor blank adjacent a first end of the elongated wall, securing the floor blank to the side wall, heating the floor blank prior to securing the floor blank to the side wall, and heating a portion of the side wall which contacts the floor blank prior to securing the floor blank to the side wall. In some embodiments, the method of forming a vessel may include the step of applying pressure to the floor blank and the portion of the side wall to secure the portion of the elongated wall with the floor blank.

In some embodiments, the method of forming a vessel may include the step of displacing a portion of the side wall that engages the floor blank to wrap the portion of the side wall around a portion of the floor blank. In some embodiments, the method of forming a vessel may include the step of compressing a portion of the side wall to increase the localized density of the compressed portion to define a fold line about which the displaced portion of the side wall is displaced.

In some embodiments, the method of forming a vessel may include the steps of heating the entire blank for a side wall to anneal the blank and allowing the blank to cool before heating first and second portions of the blank. In some embodiments, the method of forming a vessel may include the steps of forming a sheet including an insulative cellular non-aromatic polymeric material, and forming the blank for the elongated wall of the vessel from the composite.

In some embodiments, the method of forming a vessel may include the steps of applying adhesive to a portion of the elongated wall which contacts the floor blank prior to securing the floor blank to the elongated wall, applying pressure to the floor blank and the portion of the side wall to secure the portion of the elongated wall with the floor blank, displacing a portion of the elongated wall that engages the floor blank to wrap the portion of the elongated wall around a portion of the floor blank, and compressing a portion of the elongated wall to increase the localized density of the compressed portion to define a fold line about which the displaced portion of the elongated wall is displaced.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts.

The invention claimed is:

1. A method of producing a printed strip for use in forming an insulative cup, the method comprising the steps of
forming a strip of insulative cellular non-aromatic polymeric material comprising a polypropylene base resin;
printing an ink layer on the strip to form a printed strip;
cutting the printed strip to form a body blank and a floor blank;
compressing a first portion of the body blank to cause the body blank to include a first portion having a first density and a second portion having a relatively greater second density, wherein the second portion defines a fold line configured to allow the blank to be folded easily at the fold line; and
forming the body blank and the floor blank into an insulative cup.

2. The method of claim 1, further comprising the steps of
compressing additional portions of the body blank to cause the body blank to include a first portion having a first density and a second portion having a relatively greater second density;
forming a base from the body blank by coupling a portion of the body blank to another portion of the body blank, the base including a first end and an opposite second end,
forming a floor from the floor blank; and
joining the floor to the second end of the base to establish a body included in the insulative cup and formed to include an interior region defined by the floor and the base.

3. The method of claim 2, further comprising the step of orienting the body blank to cause an unprinted side of the body blank to face toward the interior region and a printed side of the body blank to face away from the interior region to establish the insulative cup.

4. The method of claim 3, further comprising the step of orienting the floor to cause an unprinted side of the floor blank to face toward the interior region and a printed side of the floor blank to face away from the interior region to establish the insulative cup.

5. The method of claim 1, wherein the first density is in a range of about 0.1 g/cm$^3$ to about 0.18 g/cm$^3$.

6. The method of claim 5, wherein the first density is in a range of about 0.1 g/cm$^3$ to about 0.185 g/cm$^3$.

7. The method of claim 6, wherein the first density is in a range of about 0.15 g/cm$^3$ to about 0.18 g/cm$^3$.

8. The method of claim 7, wherein the first density is in a range of about 0.16 g/cm$^3$ to about 0.18 g/cm$^3$.

9. The method of claim 8, wherein the first density is about 0.16 g/cm$^3$.

10. The method of claim 9, wherein the insulative cellular non-aromatic polymeric material is located between the ink layer and the interior region of the insulative cup.

11. The method of claim 10, wherein the insulative cellular non-aromatic polymeric material further comprises a polypropylene copolymer resin, at least one nucleation agent, and gas means for expanding the resins to reduce density, and wherein the polypropylene base resin has a high melt strength.

12. The method of claim 10, wherein the insulative cellular non-aromatic polymeric material comprises a polypropylene homopolymer resin, at least one nucleation agent, and gas means for expanding the resins to reduce density, and wherein the polypropylene base resin has a high melt strength.

13. A method of producing a printed strip for use in forming an insulative cup, the method comprising the steps of
forming a strip of insulative cellular non-aromatic polymeric material comprising a polypropylene base resin;
cutting the strip to form a body blank and a floor blank;
compressing a first portion of the body blank to cause the body blank to include a first portion having a first density and a second portion having a relatively greater second density, wherein the second portion defines a fold line configured to allow the blank to be folded easily at the fold line; and
forming the body blank into an insulative cup.

14. The method of claim 13, further comprising the steps of
compressing additional portions of the body blank to cause the body blank to include a first portion having a first density and a second portion having a relatively greater second density;
forming a base from the body blank by coupling a portion of the body blank to another portion of the body blank, the base including a first end and an opposite second end,
forming a floor from the floor blank; and
joining the floor to the second end of the base to establish a body included in the insulative cup and formed to include an interior region defined by the floor and the base.

15. The method of claim 14, wherein the first density is in a range of about 0.15 g/cm$^3$ to about 0.18 g/cm$^3$.

16. The method of claim 15, wherein the first density is in a range of about 0.1 g/cm$^3$ to about 0.185 g/cm$^3$.

17. The method of claim 16, wherein the first density is in a range of about 0.16 g/cm$^3$ to about 0.18 g/cm$^3$.

18. The method of claim 17, wherein the first density is about 0.16 g/cm$^3$.

* * * * *